(12) United States Patent
Miki

(10) Patent No.: US 11,368,664 B2
(45) Date of Patent: Jun. 21, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Daisuke Miki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/473,955

(22) PCT Filed: Oct. 20, 2017

(86) PCT No.: PCT/JP2017/038077
§ 371 (c)(1),
(2) Date: Jun. 26, 2019

(87) PCT Pub. No.: WO2018/135057
PCT Pub. Date: Jul. 26, 2018

(65) Prior Publication Data
US 2019/0373242 A1 Dec. 5, 2019

(30) Foreign Application Priority Data

Jan. 20, 2017 (JP) .............................. JP2017-008440

(51) Int. Cl.
*H04N 7/18* (2006.01)
*H04N 13/167* (2018.01)
*H04N 13/194* (2018.01)
*G06F 3/01* (2006.01)
*G06V 40/16* (2022.01)

(52) U.S. Cl.
CPC ........... *H04N 13/167* (2018.05); *G06F 3/011* (2013.01); *G06V 40/165* (2022.01); *G06V 40/176* (2022.01); *H04N 13/194* (2018.05); *G06F 2203/011* (2013.01); *G06V 40/178* (2022.01)

(58) Field of Classification Search
CPC ..................................................... H04N 13/167
USPC ............................................................ 348/43
See application file for complete search history.

(56) References Cited

U.S. PATENT DOCUMENTS

| | | | | |
|---|---|---|---|---|
| 5,659,691 | A * | 8/1997 | Durward ................. | A63F 13/12 |
| | | | | 715/757 |
| 9,784,976 | B2 * | 10/2017 | Nishizawa .............. | G06F 3/011 |
| 10,376,153 | B2 * | 8/2019 | Tzvieli .................. | G01J 5/0265 |

(Continued)

FOREIGN PATENT DOCUMENTS

| | | |
|---|---|---|
| CN | 102385697 A | 3/2012 |
| CN | 103975291 A | 8/2014 |

(Continued)

*Primary Examiner* — Leron Beck
(74) *Attorney, Agent, or Firm* — Paratus Law Group, PLLC

(57) ABSTRACT

There is provided an information processing apparatus to realize communication between users via a network in a more favorable manner, the information processing apparatus including: a communication unit configured to perform communication with an external device via a predetermined network and a control unit configured to perform control regarding presentation of a second image to a second user, the second image being generated by applying image processing based on first setting associated with a first user and second setting associated with the second user to a first image associated with the first user.

24 Claims, 13 Drawing Sheets

(56) References Cited

U.S. PATENT DOCUMENTS

| | | | | |
|---|---|---|---|---|
| 2006/0284791 | A1* | 12/2006 | Chen | G06F 3/011 |
| | | | | 345/8 |
| 2014/0191928 | A1* | 7/2014 | Kobayashi | G02B 27/0172 |
| | | | | 345/8 |
| 2015/0061824 | A1* | 3/2015 | Suzuki | G06F 3/011 |
| | | | | 340/5.52 |
| 2017/0091535 | A1* | 3/2017 | Yu | G06K 9/00248 |
| 2018/0157333 | A1* | 6/2018 | Ross | G06F 21/6245 |

FOREIGN PATENT DOCUMENTS

| | | | |
|---|---|---|---|
| JP | 2004-185437 | A | 7/2004 |
| JP | 2013-258555 | A | 12/2013 |
| JP | 2014-099854 | A | 5/2014 |
| JP | 2015-035769 | A | 2/2015 |

* cited by examiner

FIG. 4

| TYPE OF FACIAL EXPRESSION ($E_n$) | GAIN FOR X IMAGE ($Gm_n$) | GAIN FOR Y IMAGE ($Go_n$) |
|---|---|---|
| JOY ($E_1$) | 2.0 | 1.2 |
| SORROW ($E_2$) | 0.5 | 1.0 |
| ANGER ($E_3$) | 0.2 | 0.5 |
| SURPRISE ($E_4$) | 1.0 | 1.0 |
| ANXIETY ($E_5$) | 0.5 | 1.0 |
| DISGUST ($E_6$) | 0.2 | 0.8 |

FIG. 10

| USER Ua (TEACHER) | | |
|---|---|---|
| $E_n$ | $Gm_n$ | $Go_n$ |
| JOY ($E_1$) | 2.0 | 0.55 |
| SORROW ($E_2$) | 0.5 | 1.6 |
| ANGER ($E_3$) | 1.2 | 1.0 |
| SURPRISE ($E_4$) | 1.0 | 1.0 |
| ANXIETY ($E_5$) | 0.5 | 1.6 |
| DISGUST ($E_6$) | 0.2 | 4.0 |

| USER Ub (STUDENT) | | |
|---|---|---|
| $E_n$ | $Gm_n$ | $Go_n$ |
| JOY ($E_1$) | 2.0 | 0.55 |
| SORROW ($E_2$) | 0.5 | 1.6 |
| ANGER ($E_3$) | 0.8 | 0.92 |
| SURPRISE ($E_4$) | 1.0 | 1.0 |
| ANXIETY ($E_5$) | 0.5 | 1.6 |
| DISGUST ($E_6$) | 0.2 | 4.0 |

FIG. 12

USER Ua (TEACHER)

| $E_n$ | $Gm_n$ | USER Ub $Go_n$ | USER Uc $Go_n$ |
|---|---|---|---|
| JOY ($E_1$) | 2.0 | 0.55 | 0.55 |
| SORROW ($E_2$) | 0.5 | 1.6 | 1.6 |
| ANGER ($E_3$) | 1.2 | 1.0 | 1.0 |
| SURPRISE ($E_4$) | 1.0 | 1.0 | 1.0 |
| ANXIETY ($E_5$) | 0.5 | 1.6 | 1.6 |
| DISGUST ($E_6$) | 0.2 | 4.0 | 4.0 |

USER Ub (STUDENT)

| $E_n$ | $Gm_n$ | USER Ua $Go_n$ | USER Uc $Go_n$ |
|---|---|---|---|
| JOY ($E_1$) | 2.0 | 0.55 | 1.2 |
| SORROW ($E_2$) | 0.5 | 1.6 | 1.0 |
| ANGER ($E_3$) | 0.8 | 0.92 | 0.5 |
| SURPRISE ($E_4$) | 1.0 | 1.0 | 1.0 |
| ANXIETY ($E_5$) | 0.5 | 1.6 | 1.0 |
| DISGUST ($E_6$) | 0.2 | 4.0 | 0.8 |

USER Uc (STUDENT)

| $E_n$ | $Gm_n$ | USER Ua $Go_n$ | USER Ub $Go_n$ |
|---|---|---|---|
| JOY ($E_1$) | 2.0 | 0.55 | 1.2 |
| SORROW ($E_2$) | 0.5 | 1.6 | 1.0 |
| ANGER ($E_3$) | 0.8 | 0.92 | 0.8 |
| SURPRISE ($E_4$) | 1.0 | 1.0 | 1.0 |
| ANXIETY ($E_5$) | 0.5 | 1.6 | 1.0 |
| DISGUST ($E_6$) | 0.2 | 4.0 | 0.8 |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/038077 (filed on Oct. 20, 2017) under 35 U.S.C. § 371, which claims priority to Japanese Patent Application No. 2017-008440 (filed on Jan. 20, 2017), which are all hereby incorporated by reference in their entirety.

TECHNICAL FIELD

The present disclosure relates to an information processing apparatus, an information processing method, and a program.

BACKGROUND ART

With the development of networks and communication tools, modes of communication between users at remote locations are becoming more diverse, and not only audio communication but also communication via images such as still images and moving images becomes possible.

Furthermore, in recent years, various technologies for communication between users at remote locations, assuming use of head-mounted devices such as head mounted displays (HMD) as communication tools, have been studied. For example, Patent Document 1 discloses an example of a system using a head-mounted device, as an example of a technology for realizing communication between users via a network.

CITATION LIST

Patent Document

Patent Document 1: Japanese Patent Application Laid-Open No. 2013-258555

SUMMARY OF THE INVENTION

Problems to be Solved by the Invention

By the way, between face-to-face users, smoother communication is realized using not only language communication with languages such as a voice but also so-called non-verbal communication using a facial expression, a line of sight, a posture, a body motion, and the like together. Under such circumstances, provision of a technology capable of realizing non-verbal communication in a more favorable manner even in communication between users via a network is required.

Therefore, the present disclosure proposes an information processing apparatus, an information processing method, and a program capable of realizing communication between users via a network in a more favorable manner.

Solutions to Problems

According to the present disclosure, provided is an information processing apparatus including a communication unit configured to perform communication with an external device via a predetermined network and a control unit configured to perform control regarding presentation of a second image to a second user, the second image being generated by applying image processing based on first setting associated with a first user and second setting associated with the second user to a first image associated with the first user.

Furthermore, according to the present disclosure, provided is an information processing method including, by a computer, performing communication with an external device via a predetermined network, and performing control regarding presentation of a second image to a second user, the second image being generated by applying image processing based on first setting associated with a first user and second setting associated with the second user to a first image associated with the first user.

Furthermore, according to the present disclosure, provided is a program for causing a computer to perform communication with an external device via a predetermined network, and perform control regarding presentation of a second image to a second user, the second image being generated by applying image processing based on first setting associated with a first user and second setting associated with the second user to a first image associated with the first user.

Effects of the Invention

According to the above-described present disclosure, an information processing apparatus, an information processing method, and a program capable of realizing communication between users via a network in a more favorable manner are provided.

Note that the above-described effect is not necessarily limited, and any of effects described in the present specification or other effects that can be grasped from the present specification may be exerted in addition to or in place of the above-described effect.

BRIEF DESCRIPTION OF DRAWINGS

FIG. 4 is a diagram illustrating an example of setting of gains applied according to types of facial expression.

FIG. 10 is an explanatory diagram for describing an example of gain control in an information processing system according to the second modification.

FIG. 12 is an explanatory diagram for describing an example of gain control in an information processing system according to the third modification.

MODE FOR CARRYING OUT THE INVENTION

Favorable embodiments of the present disclosure will be described in detail with reference to the appended drawings. Note that, in the present specification and drawings, redundant description of configuration elements having substantially the same functional configuration is omitted by providing the same sign.

Note that the description will be given in the following order.

Figure 1:
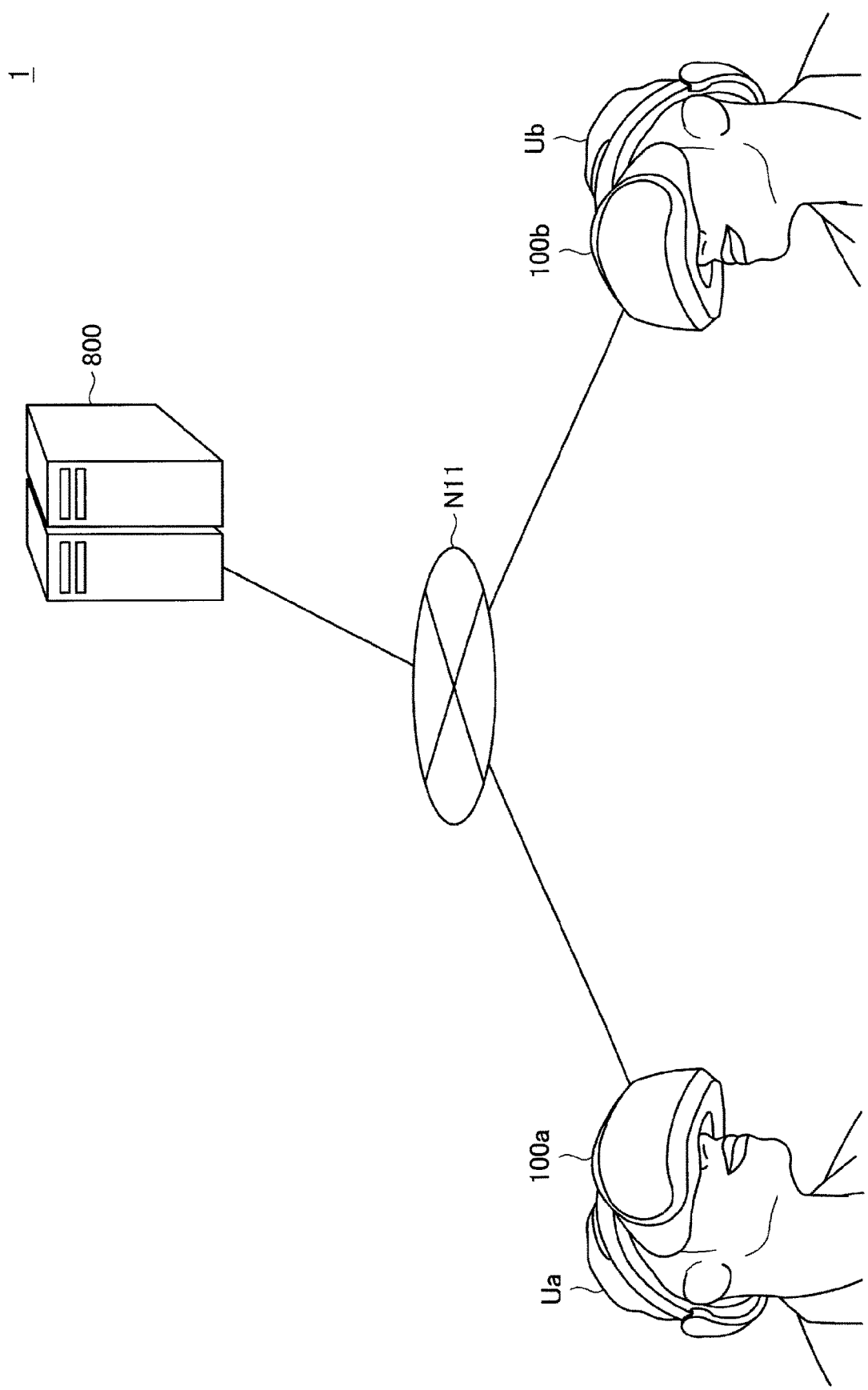
FIG. 1 is a diagram illustrating an example of a schematic system configuration of an information processing system according to an embodiment of the present disclosure.

1. Schematic configuration
2. Study on communication between users
3. Technical characteristics
3.1. Overview
3.2. Functional configuration
3.3. Processing
3.4. Modification
4. Example of hardware configuration
5. Conclusion 1. Schematic Configuration First, an example of a schematic configuration of an information processing system according to an embodiment of the present disclosure will be described. For example, FIG. 1 is a diagram illustrating an example of a schematic system configuration of an information processing system according to an embodiment of the present disclosure.

An information processing system 1 according to the present embodiment provides a mechanism for realizing communication among a plurality of users via a network. Specifically, as illustrated in FIG. 1, the information processing system 1 according to the present embodiment includes a plurality of information processing apparatuses 100. For example, in the example illustrated in FIG. 1, users Ua and Ub use information processing apparatuses 100a and 100b respectively associated with the users Ua and Ub as communication tools. The information processing apparatus 100a and the information processing apparatus 100b are connected to be able to transmit and receive information to and from each other via a predetermined network N11. Furthermore, the information processing system 1 may include a server 800, and communication between the information processing apparatus 100a and the information processing apparatus 100b may be mediated by the server 800.

Note that the type of the network N11 is not particularly limited. As a specific example, the network N11 may be configured by a so-called wireless network such as a network based on the Wi-Fi (registered trademark) standard. Furthermore, as another example, the network N11 may be configured by the Internet, a dedicated line, a local area network (LAN), a wide area network (WAN), or the like. Furthermore, the network N11 may include a plurality of networks, and at least a part of the networks may be configured as a wired network.

Figure 2:
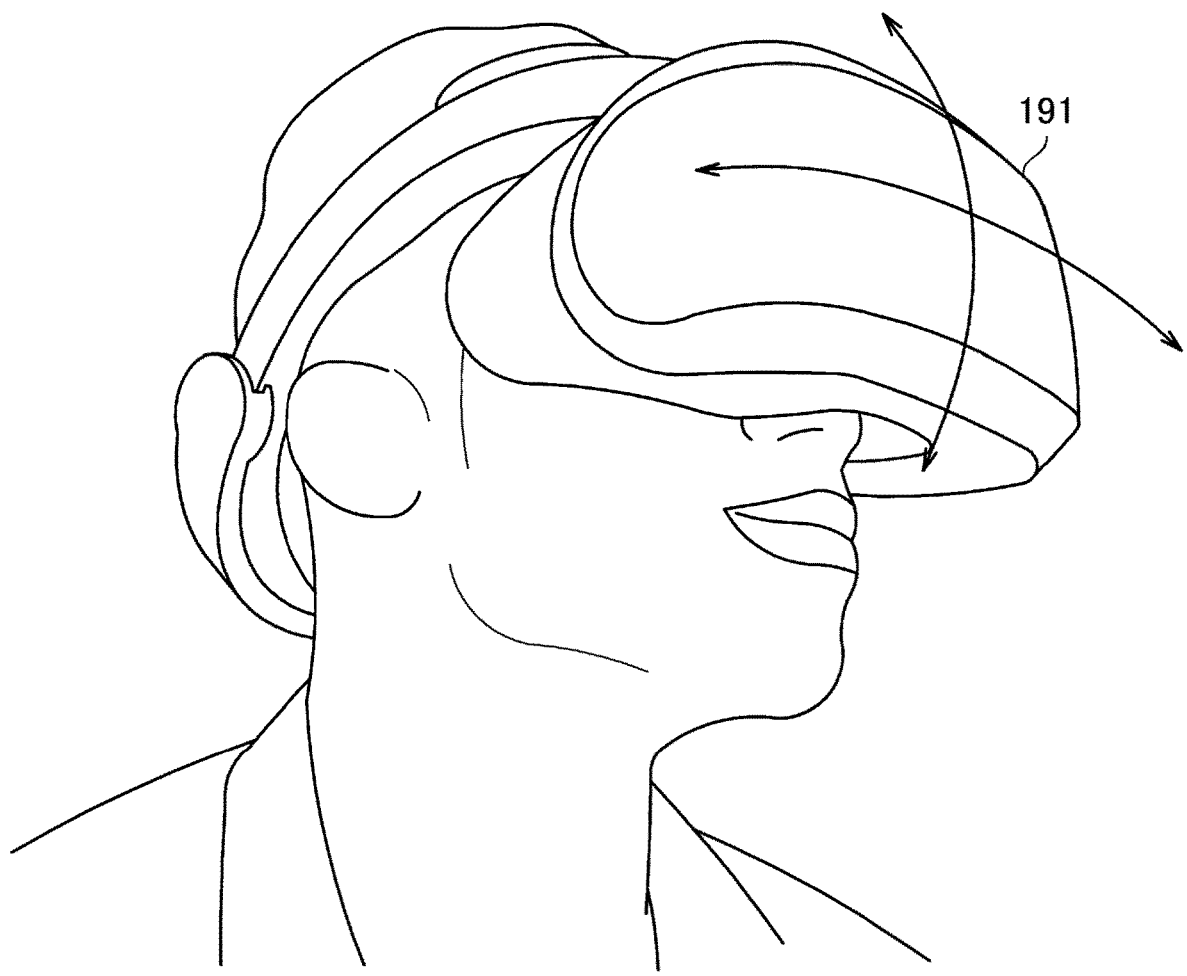
FIG. 2 is an explanatory diagram for describing an example of a schematic configuration of an information processing apparatus according to the embodiment.

The information processing apparatus 100 is configured as a head-mounted device such as a so-called HMD. For example, FIG. 2 is an explanatory diagram for describing an example of a schematic configuration of an information processing apparatus according to the embodiment. As illustrated in FIG. 2, the information processing apparatus 100 is mounted on the head of the user to hold an output unit 191 (for example, a display panel) for displaying an image in front of the eyes of the user. Furthermore, the information processing apparatus 100 may also include a sound output unit such as a so-called speaker, headphone, or earphone (not illustrated) for outputting a sound such as a voice.

Furthermore, although not illustrated, the information processing apparatus 100 may include a sound collection unit such as a so-called microphone for collecting sounds such as user's voice and surrounding environmental sound, an imaging unit such as a so-called digital camera for capturing an image of a user, and the like. Furthermore, the sound collection unit and the imaging unit may be provided as devices different from the information processing apparatus 100 and may be configured to operate in cooperation with the information processing apparatus 100.

Note that the head-mounted displays (HMD) applicable as the information processing apparatus 100 include a so-called immersive HMD, a see-through HMD, a video see-through HMD, and a retinal projection HMD.

In a case where the immersive HMD is mounted on the head or face of the user, the immersive HMD is mounted to cover the eyes of the user, and a display unit such as a display is held in front of the eyes of the user. Therefore, the user wearing the immersive HMD has a difficulty in directly taking an external scenery (in other words, scenery of a real world) into view, and only an image displayed on a display unit comes into view. With such a configuration, the immersive HMD can provide an immersive feeling to the user who is viewing the image. Note that the information processing apparatus 100 illustrated in FIG. 2 can be configured as an immersive HMD.

The see-through HMD uses, for example, a half mirror or a transparent light guide plate to hold a virtual image optical system including a transparent light guide or the like in front of the eyes of the user, and displays an image inside the virtual image optical system. Therefore, the user wearing the see-through HMD can take the external scenery into view while viewing the image displayed inside the virtual image optical system. Note that a specific example of the see-through HMD includes a so-called glasses-type wearable device in which a portion corresponding to a lens of glasses is configured as a virtual image optical system.

The video see-through HMD is mounted to cover the eyes of the user, and a display unit such as a display is held in front of the eyes of the user, similarly to the immersive HMD. Meanwhile, the video see-through HMD includes an imaging unit for capturing surrounding scenery, and causes the display unit to display an image of the scenery in a line of sight direction of the user captured by the imaging unit. With such a configuration, the user wearing the video see-through HMD has a difficulty in directly taking the external scenery into view but the user can confirm the external scenery with the image displayed on the display unit.

The retinal projection HMD has a projection unit held in front of the eyes of the user, and an image is projected from the projection unit toward the eyes of the user such that the image is superimposed on the external scenery. More specifically, in the retinal projection HMD, an image is directly projected from the projection unit onto the retinas of the eyes of the user, and the image is imaged on the retinas. With such a configuration, the user can view a clearer image even in a case where the user has myopia or hyperopia. Furthermore, the user wearing the retinal projection HMD can take the external scenery into view even while viewing the image projected from the projection unit.

Furthermore, the information processing apparatus 100 according to the present embodiment may be provided with various sensors such as, for example, an acceleration sensor and an angular velocity sensor (gyro sensor) and configured to be able to detect a movement of the head (a posture of the head) of the user wearing the information processing apparatus 100. As a specific example, the information processing apparatus 100 may detect components in a yaw direction, a pitch direction, and a roll direction as the movement of the head of the user. On the basis of such a configuration, the information processing apparatus 100 can estimate a line of sight direction of the user according to detection results of the movement of the head of the user by the various sensors and can present an image according to the estimated line of sight direction to the user via the output unit 191, for example. Thus, for example, the user can refer to an image expanded wider than a user's field of view, such as a so-called all-around image or an image in a virtual space realized by a so-called virtual reality (VR) technology, while moving a viewpoint to look around the image.

The information processing apparatus 100a used by the user Ua transmits an image (for example, a moving image or a still image) of the user Ua captured by the imaging unit to another information processing apparatus 100b via the network N11 on the basis of the above configuration, for example. The information processing apparatus 100b used by the user Ub presents the image of the user Ua transmitted from the information processing apparatus 100a via the network N11 to the user Ub via the output unit 191. Similarly, an image of the user Ub may be transmitted from the information processing apparatus 100b to the information processing apparatus 100a via the network N11, and may be presented to the user Ua via the output unit 191 of the information processing apparatus 100a. Furthermore, in addition to the images of the users, for example, voices of the users collected by the sound collection units such as microphones may be transmitted and received between the information processing apparatuses 100a and 100b and may be presented to the users via the sound output units such as speakers, earphones, or headphones. With the above configuration, the users Ua and Ub can communicate with each other through the network N11 even at remote locations by using the information processing apparatuses 100 as communication tools.

An example of a schematic configuration of the information processing system according to the embodiment of the present disclosure has been described with reference to FIGS. 1 and 2.

2. Study on Communication Between Users

Subsequently, communication between users will be described with particular attention to a case of using a head-mounted device such as an HMD as a communication tool, and then problems of the information processing system according to the present embodiment will be organized.

Generally, between face-to-face users, smoother communication is realized using not only language communication with languages such as a voice but also so-called non-verbal communication using a facial expression, a line of sight, a posture, a body motion, and the like together.

Furthermore, in recent years, with the development of networks and communication tools, modes of communication between users at remote locations are becoming more diverse, and not only audio communication but also communication via images such as still images and moving images becomes possible.

For example, in recent years, use of a head-mounted device such as an HMD has attracted attention as the communication tool, and various technologies for communication between users at remote locations, assuming the use of the device, have also been studied. As a specific example, by applying a VR technology, the users at remote locations can share a virtual space via a network and communicate with each other in the virtual space. In such communication in the virtual space, a realistic feeling as if the user were in the virtual space can be provided to the user by using the HMD as the communication tool. Thus, for example, in the communication between users in the virtual space, a situation as if the users were facing each other can be simulated.

Furthermore, as another example, a so-called augmented reality (AR) technology can be applied to communication between users via a network. As a specific example, an image of another user who is a communication partner can be presented so as to be superimposed on a real space by applying an AR technology. With such a configuration, in the communication between the users at remote locations, a situation as if a user as a communication partner were present in front of the eyes of the other user, and the users were facing each other can be simulated. Note that, in this case, the see-through HMD, the video see-through HMD, the retinal projection HMD, or the like can be applied, for example, as the communication tool.

In this way, with the development of various technologies in recent years, the situation as if the users at remote locations were facing each other has become able to be simulated. From such background, to enable smoother communication between users via a network, provision of a technology capable of realizing non-verbal communication between the users in a more favorable manner is required.

Meanwhile, in the situation where the head-mounted device such as an HMD is used as the communication tool, communication is performed with the device mounted on the head. Therefore, for example, even if an image of the appearance of the user is captured by an external imaging unit or the like, at least a part of the face (particularly, a periphery of the eyes) of the user is blocked by the device mounted on the head, and thus there are cases where discrimination of the facial expression of the user from the captured image is difficult. Realization of non-verbal communication using the user's facial expression may be difficult in such a situation.

Furthermore, in the communication via a network, while there are cases where an environment where each user is placed is different, there are cases where recognition of the environment where each user is placed is difficult for another user. Therefore, for a certain user, a situation where the user is uncomfortable taking a relatively large reaction is assumed, and there are also cases where another user has a difficulty in recognizing such a situation. In such a case, for example, a situation where one user is forced to make a reaction smaller is assumed, and such a reaction gives an impression to another user that the reaction is different from an original intention, and thus occurrence of misunderstanding may be assumed.

Furthermore, the impression received from the magnitude of the reaction differs depending on the user's condition such as physical condition, whereas in the communication via a network, there are cases where another user has a difficulty in recognizing the state of the user. Therefore, for example, even in a situation where too large reaction of the other user is burdened on (for example, stressful for) one user due to a poor physical condition or the like, the other user may be assumed to have a difficulty in spontaneously adjusting the magnitude of the reaction in view of the state of the one user.

In view of the foregoing, the present disclosure proposes a technology capable of realizing communication between users via a network, in particular, non-verbal communication using a head-mounted device such as an HMD as a communication tool in a favorable manner.

3. Technical Characteristics

3.1. Overview

First, an overview of the information processing system according to the present embodiment will be described. As described above, since the head-mounted device such as an HMD is used as the communication tool in the information processing system according to the present embodiment, there are cases where discrimination of the facial expression of the user from a captured image of the user who wears the device is difficult.

Therefore, the information processing apparatus 100 according to the present embodiment detects various states of a user with a predetermined detection unit such as various sensors, and estimates a facial expression or an emotion of the user according to detection results. As a specific example, the information processing apparatus 100 may estimate the facial expression or the emotion of the user on the basis of a detection result of biological information of the user by a so-called biological information acquisition sensor. Examples of biological information include body temperature, pulse, blood component, sweating, electroencephalogram, cerebral blood flow, eye potential, myoelectric potential, and the like.

Note that the configuration and the installation position of the detection unit may be appropriately determined according to a detection object. For example, an electroencephalogram sensor for detecting information related to an electroencephalogram, a blood sensor for detecting information related to a blood component, or the like may be provided at a position closer to the brain in a case where the user wears the information processing apparatus 100 such as a place coming in contact with the forehead of the user, of a housing of the information processing apparatus 100. Furthermore, as another example, a body temperature sensor for detecting a body temperature, a pulse sensor for detecting a pulse, and the like may be provided at a position where the sensor can easily measure the body temperature or the pulse, such as a place coming in contact with an ear or surroundings of the ear of the user, of the housing of the information processing apparatus 100.

Of course, the above-described examples of the detection unit are merely examples, and the state of the detection object, the configuration for detecting the state, the installation position of the configuration, and the like are not particularly limited as long as the detection unit can estimate the facial expression or the emotion of the user.

Next, the information processing apparatus 100 applies image processing to an image associated with the user (for example, an image of the face of the user) according to the estimation result of the facial expression or the emotion to generate an image reflecting the facial expression or the emotion of the user. Note that, at this time, the information processing apparatus 100 may control an application amount (for example, a gain, a degree, or a level) of the image processing to be applied to an image associated with the user according to predetermined setting (for example, setting based on a preliminary user input).

Then, the information processing apparatus 100 transmits the image generated according to the image processing and reflecting the facial expression or the emotion of the user to another information processing apparatus 100 via the network. Note that, in the present description, it is assumed that the information processing apparatus 100a used by the user Ua transmits the image reflecting the facial expression or the emotion of the user Ua to the information processing apparatus 100b used by the user Ub via the network. In this case, the information processing apparatus 100b presents the image transmitted from the information processing apparatus 100a (in other words, the image reflecting the facial expression or the emotion of the user Ua) to the user Ub via the output unit 191.

With such a configuration, the image reflecting the facial expression or the emotion of the user can be presented to another user via the network by the user wearing the head-mounted device even in a situation where at least a part of the face of the user is blocked. Furthermore, as described above, the information processing apparatus 100 controls the application amount of the image processing for the image associated with the user according to the predetermined setting. By such control, for example, an image simulating the facial expression or emotion intended by the user can be presented to another user by increasing the application amount of the image processing even in a situation where the user is uncomfortable actually taking an overreaction.

Furthermore, when presenting the image reflecting the facial expression or emotion of the user Ua to the user Ub, the information processing apparatus 100b may adjust the facial expression of the user Ua in the image according to the setting associated with the user Ub (for example, setting specified by the user Ub). With such a configuration, for example, the facial expression of the user Ua in the image to be presented to the user Ub can be adjusted on the information processing apparatus 100b side according to the state of the user Ub even in a situation where the user Ua has a difficulty in spontaneously adjusting the facial expression in view of the state on the user Ub side.

As described above, the information processing system according to the present embodiment realizes non-verbal communication using the user's facial expression in a more favorable manner between the users via the network.

An overview of the information processing system according to the present embodiment has been described. Note that, hereinafter, the information processing system according to the present embodiment will be described in more detail.

3.2. Functional Configuration

Figure 3:
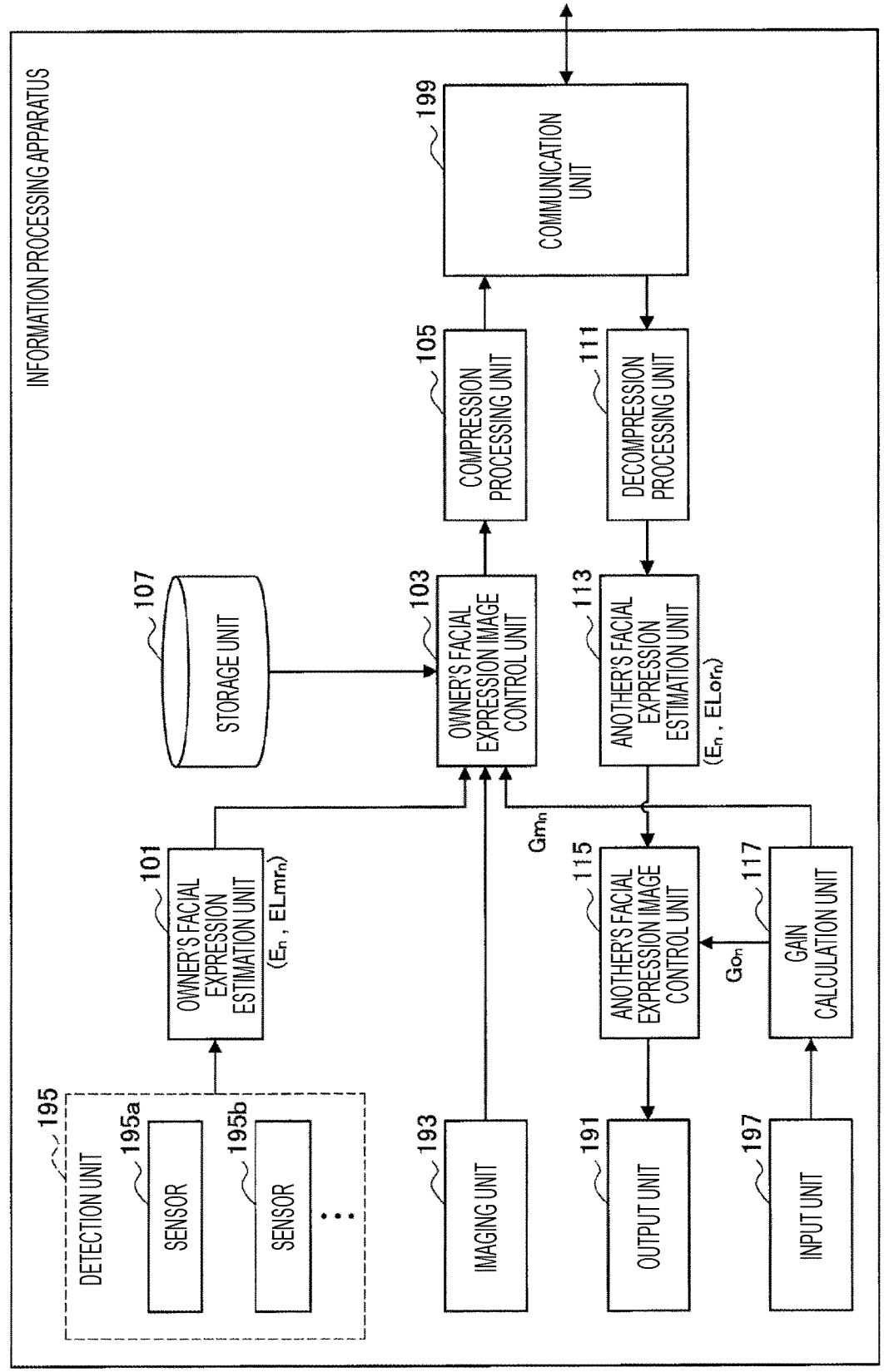
FIG. 3 is a block diagram illustrating an example of a functional configuration of the information processing apparatus according to the embodiment.

Next, an example of a functional configuration of the information processing apparatus 100 according to the present embodiment will be described with reference to FIG. 3. FIG. 3 is a block diagram illustrating an example of a functional configuration of the information processing apparatus 100 according to the present embodiment.

As illustrated in FIG. 3, the information processing apparatus 100 according to the present embodiment includes an output unit 191, an input unit 197, an imaging unit 193, a detection unit 195, a communication unit 199, an owner's facial expression estimation unit 101, an owner's facial expression image control unit 103, a storage unit 107, another's facial expression estimation unit 113, another's facial expression image control unit 115, and a gain calculation unit 117. Furthermore, the information processing apparatus 100 may also include a compression processing unit 105 and a decompression processing unit 111.

The communication unit 199 is a configuration for the information processing apparatus 100 to transmit and receive various types of information to and from another apparatus (for example, an external apparatus such as the server 800 or another information processing apparatus 100) via a predetermined network. The communication unit 199 may include, for example, a communication antenna, a radio frequency (RF) circuit, a baseband processor, and the like, in a case of transmitting and receiving various types of information to and from another apparatus via a wireless network. Note that, in the following description, in a case where each configuration of the information processing apparatus 100 transmits and receives information to and from another apparatus, the transmission and reception of the information is performed via the communication unit 199 unless otherwise specially described.

The output unit 191 corresponds to the output unit 191 described with reference to FIG. 2 and presents information to be presented to the user as image information presented in a visually recognizable manner, for example. The output unit 191 may be configured by, for example, a liquid crystal display (LCD), an organic light emitting diode (OLED) display, or the like.

The input unit 197 is an input interface for the user to input various types of information to the information processing apparatus 100. The input unit 197 may include, for example, an input device such as a button, a lever, and a touch panel.

The imaging unit 193 is configured to capture an image of the user and may be configured by, for example, a so-called camera (digital camera) or the like. For example, the imaging unit 193 is configured as a device different from the information processing apparatus 100, and may capture an image (for example, a still image or a moving image) of the appearance of the user wearing the information processing apparatus 100. Then, the imaging unit 193 outputs the captured image of the user to the owner's facial expression image control unit 103.

The storage unit 107 is a storage area for temporarily or constantly storing various data. In the storage unit 107, for example, an image associated with the user of the information processing apparatus 100 is stored. Note that an example of the image associated with the user includes an image in which the face of the user is presented. Furthermore, another example includes an image of a preset character (particularly, an image of the face of the character) that may be stored as the image associated with the user, as an intermediary for presenting the facial expression of the user to another user. As a specific example, an avatar image (particularly, an image of the face of the avatar) preset for the user may be stored as the image associated with the user.

Note that the above-described image associated with the user corresponds to an example of a "first image".

The detection unit 195 is a configuration for detecting various states and situations of the user, and may include, for example, one or more various sensors (for example, sensors 195a, 195b, and the like illustrated in FIG. 3). Examples of the various sensors configuring the detection unit 195 include the biological information acquisition sensor for detecting the biological information such as the body temperature, pulse, blood component, sweating, electroencephalogram, cerebral blood flow, eye potential, and myoelectric potential. Furthermore, as another example, the detection unit 195 includes a sound collection unit for collecting a sound such as a voice, and collects the voice uttered by the user with the sound collection unit, thereby acquiring information indicating a vocal sound, a volume, and the like of the user on the basis of a sound collection result. Furthermore, the detection unit 195 may also acquire information indicating content of a conversation of the user by analyzing a collected sound. Furthermore, the detection unit 195 may also acquire information indicating a state of a pupil of an eye of the user, information indicating a state of blinking, or the like. In this case, for example, the detection unit 195 includes an imaging unit such as a so-called camera, and images an image of an eye of the user with the imaging unit and analyzes an imaging result of the image, thereby acquiring the information indicating a state of a pupil or the information indicating a state of blinking. Furthermore, whether or not the user is shedding tears can be detected by the imaging unit on the basis of the imaging result of the image of the eye of the user.

The detection unit 195 detects various states and situations of the user as described above, and outputs information indicating the detection result to the owner's facial expression estimation unit 101.

The owner's facial expression estimation unit 101 acquires the information indicating the detection result of various states and situations of the user from the detection unit 195, and estimates the facial expression or the emotion of the user (hereinafter collectively referred to as "facial expression") on the basis of the acquired information. Specifically, the owner's facial expression estimation unit 101 estimates a preset type $E_n$ of the facial expression such as emotions or the like, and a facial expression level $ELmr_n$ indicating the degree of the facial expression. Note that, in the present description, the description will be given on the assumption that "joy ($E_1$)", "sorrow ($E_2$)", "anger ($E_3$)", "surprise ($E_4$)", "anxiety ($E_5$)", and "disgust ($E_6$)" are set as the type $E_n$ of the facial expression. Furthermore, an existing technology can be used as a technique for estimating the type of the facial expression and the facial expression level by using the detection results of the various states and situations such as the biological information. Therefore, detailed description of the estimation technique is omitted.

Then, the owner's facial expression estimation unit 101 outputs information indicating estimation results of the type $E_n$ of the facial expression and the facial expression level $ELmr_n$ to the owner's facial expression image control unit 103.

The gain calculation unit 117 determines a gain for controlling the application amount of the image processing to be applied to the image associated with the user (for example, the image of the face of the user) on the basis of a predetermined condition according to the estimation result of the facial expression of the user. As a specific example, the gain calculation unit 117 may determine the gain on the basis of specification (in other words, a user input) from the user via the input unit 197. Furthermore, the gain calculation unit 117 may individually determine the gain for each type $E_n$ of the facial expression.

Note that, although details will be described below, as the gain, a gain $Gm_n$ applied to the image processing executed by the owner's facial expression image control unit 103 and a gain $Go_n$ applied to the image processing executed by the another's facial expression image control unit 115 are set. Specifically, the gain $Gm_n$ is a gain for controlling the application amount of the image processing for the image associated with the user who uses the information processing apparatus 100. Furthermore, the gain $Go_n$ is a gain for controlling the application amount of the image processing for the image associated with another user transmitted from another information processing apparatus 100. Note that, in the following description, the user who uses the information processing apparatus 100 is also referred to as "owner user" and the image associated with the owner user is also referred to as "owner user image". Furthermore, the another user who uses the another information processing apparatus 100 is also referred to as "another user" and the image associated with the another user is also referred to as "another user image". Furthermore, the gain $Gm_n$ applied to image processing executed by the owner's facial expression image control unit 103 is also referred to as a "gain $Gm_n$ for an owner's image". Furthermore, the gain $Go_n$ applied to image processing executed by the another's facial expression image control unit 115 is also referred to as a "gain $Go_n$ for another's image".

For example, FIG. 4 is a diagram illustrating an example of setting of gains applied according to types of facial expression. In the example illustrated in FIG. 4, the gain $Gm_n$ for the owner's image and the gain $Go_n$ for the another's image are set to each of "joy ($E_1$)", "sorrow ($E_2$)", "anger ($E_3$)", "surprise ($E_4$)", "anxiety ($E_5$)", and "disgust ($E_6$)".

Then, the gain calculation unit 117 outputs, to the owner's facial expression image control unit 103, information indicating the gain $Gm_n$ for an owner's image determined in accordance with the predetermined condition. Furthermore, the gain calculation unit 117 outputs, to the another's facial expression image control unit 115, information indicating the gain $Go_n$ for another's image determined according to the predetermined condition.

The owner's facial expression image control unit 103 is configured to generate an image of the owner user, the image reflecting the estimation result of the facial expression of the owner user.

Specifically, the owner's facial expression image control unit 103 acquires the information indicating the estimation result of the facial expression of the owner user (in other words, the information indicating the estimation results of the type $E_n$ of the facial expression and the facial expression level $ELmr_n$) from the owner's facial expression estimation unit 101. Furthermore, the owner's facial expression image control unit 103 reads the image associated with the user stored in advance in the storage unit 107 (in other words, the owner user image) from the storage unit 107. Furthermore, the owner's facial expression image control unit 103 acquires the information indicating the gain $Gm_n$ for the owner's image (particularly, the information indicating the gain $Gm_n$ corresponding to the estimation result of the type $E_n$ of the facial expression) from the gain calculation unit 117. Then, the owner's facial expression image control unit 103 adjusts the facial expression level $ELmr_n$ on the basis of the acquired information indicating the gain $Gm_n$ for the owner's image. For example, in a case where the facial expression level after adjustment is $ELma_n$, the facial expression level $ELma_n$ after adjustment is calculated by a calculation expression illustrated as (Expression 1) below.

[Mathematical Expression 1]

$$ELma_n = Gm_n \times ELmr_n \qquad \text{(Expression 1)}$$

Next, the owner's facial expression image control unit 103 applies the image processing according to the estimation result of the type $E_n$ of the facial expression to the owner user image read from the storage unit 107 by the application amount according to the facial expression level $ELma_n$ after adjustment, thereby generating the owner user image reflecting the estimation result of the facial expression of the owner user. Note that the owner user image reflecting the estimation result of the facial expression of the owner user corresponds to an example of an "third image".

Furthermore, the owner's facial expression image control unit 103 acquires an image of the appearance of the owner user captured by the imaging unit 193 (in other words, an image of the owner user wearing the information processing apparatus 100) from the imaging unit 193. The owner's facial expression image control unit 103 applies an image analysis to the acquired image to estimate the position and direction of the face of the owner user in the image, and synthesizes an owner user image (for example, a face image) reflecting an estimation result of the facial expression of the owner user with the acquired image according to the estimation result. With the synthesis, the image of the appearance of the owner user reflecting the estimation result of the facial expression of the owner user is generated. Note that, hereinafter, the image of the appearance of the owner user synthesized with the owner user image is also referred to as an "owner's image". Then, the owner's facial expression image control unit 103 outputs data of the generated owner's image to the compression processing unit 105.

The compression processing unit 105 acquires the data of the generated owner's image from the owner's facial expression image control unit 103, and applies compression processing (encoding processing) based on a predetermined format to the acquired data of the owner's image. Furthermore, the compression processing unit 105 may apply, for example, encoding processing, encryption processing according to a predetermined standard to the data of the owner's image, or the like. Then, the compression processing unit 105 transmits the data of the owner's image to which the compression processing has been applied to another apparatus (for example, the another information processing apparatus 100, the server 800, or the like) via a predetermined network.

The decompression processing unit 111 acquires data of an image of the appearance of another user (hereinafter, the image is also referred to as "another's image") generated by the another information processing apparatus 100 from the another apparatus (for example, the another information processing apparatus 100, the server 800, or the like) via a predetermined network. The decompression processing unit 111 applies decompression processing (decoding processing) based on a predetermined format to the acquired data of the another's image to restore the another's image. Furthermore, at this time, in a case where the encoding processing or the encryption processing according to the predetermined standard has been applied to the acquired data, the decompression processing unit 111 may apply demodulation processing or decryption processing according to the standard to restore the another's image. Then, the decompression processing unit 111 outputs data of the restored another's image to the another's facial expression estimation unit 113.

The another's facial expression estimation unit 113 acquires the data of the another's image from the decompression processing unit 111. The another's facial expression estimation unit 113 applies image analysis processing to the acquired another's image to estimate the position and direction of the face of the another user in the another's image, and extracts a face image of the another user (in other words, the another user image) from the another's image on the basis of an estimation result. Note that the extracted another user image corresponds to a face image of the another user generated according to an estimation result of a facial expression of the another user in the another information processing apparatus 100 used by the corresponding another user.

Furthermore, the another's facial expression estimation unit 113 applies image analysis processing to the extracted another user image to estimate a facial expression of the another user. Specifically, the another's facial expression estimation unit 113 estimates a type $E_n$ of the facial expression of the another user and a facial expression level $ELor_n$ indicating the degree of the facial expression. Note that an existing technology can be used as a technique for estimating the type of the facial expression and the facial expression level on the basis of the image analysis. Therefore, detailed description of the estimation technique is omitted.

Then, the another's facial expression estimation unit 113 outputs the another's image acquired from another apparatus via the network and information indicating estimation results of the type $E_n$ of the facial expression of the another user and the facial expression level $ELor_n$ corresponding to the another's image to the another's facial expression image control unit 115.

The another's facial expression image control unit 115 is a configuration for generating an image of the another user (in other words, the another's image) to be presented to the owner user by adjusting the facial expression of the another user presented in the another's image on the basis of a predetermined condition.

The another's facial expression image control unit 115 acquires the another's image acquired from another apparatus and the information indicating estimation results of the type $E_n$ of the facial expression of the another user and the facial expression level $ELor_n$ corresponding to the another's image from the another's facial expression estimation unit 113. Furthermore, the another's facial expression image control unit 115 acquires the information indicating the gain $Go_n$ for the another's image (particularly, the information indicating the gain $Go_n$ corresponding to the estimation result of the type $E_n$ of the facial expression) from the gain calculation unit 117. Then, the another's facial expression image control unit 115 adjusts the facial expression level $ELor_n$ on the basis of the acquired information indicating the gain $Go_n$ for the another's image. For example, in a case where the facial expression level after adjustment is $ELoa_n$, the facial expression level $ELoa_n$ after adjustment is calculated by a calculation expression illustrated as (Expression 2) below.

[Mathematical Expression 2]

$$ELoa_n = Go_n \times ELor_n \quad \text{(Expression 2)}$$

Note that, in a case where it is considered that the facial expression level of the another's image acquired from the another apparatus is controlled by the owner's facial expression image control unit 103 according to the estimation result based on the above-described (Expression 1), the above-described (Expression 2) can also be expressed by a relational expression described as (Expression 3) below.

[Mathematical Expression 3]

$$ELoa_n = Go_n \times Gm_n \times ELmr_n \quad \text{(Expression 3)}$$

In the above-described (Expression 3), $ELmr_n$ corresponds to the estimation result of the facial expression level of the user of the another information processing apparatus 100 (in other words, the another user) by the another information processing apparatus 100. Furthermore, the gain $Gm_n$ corresponds to the gain applied by the another information processing apparatus 100 to the estimation result of the facial expression level $ELmr_n$. In other words, it can be also said that the adjusted facial expression level $ELoa_n$ illustrated in (Expression 3) reflects the adjustment result of the facial expression in the another information processing apparatus 100.

Next, the another's facial expression image control unit 115 applies the image processing according to the estimation result of the type $E_n$ of the facial expression to the face image of the another user (the another user image extracted by the another's facial expression estimation unit 113, for example) in the another's image by the application amount according to the facial expression level $ELoa_n$ after adjustment, thereby generating the image of the another user reflecting the estimation result of the facial expression of the another user. Note that the another user image reflecting the estimation result of the facial expression of the another user corresponds to an example of a "second image".

Then, the another's facial expression image control unit 115 presents the image of the another user reflecting the estimation result of the facial expression of the another user to the user via the output unit 191. Note that the control regarding the presentation of the image of the another user by the another's facial expression image control unit 115 via the output unit 191 corresponds to an example of control regarding presentation of the image to the owner user.

As described above, in the information processing system 1 according to the present embodiment, the information processing apparatus 100a used by the user Ua estimates the facial expression of the user Ua on the basis of the detection result of the detection unit 195. Next, the information processing apparatus 100a applies the image processing according to the estimation result of the facial expression to the image associated with the user Ua, thereby generating the image (owner's image) of the user Ua reflecting the estimation result of the facial expression. Furthermore, at this time, the information processing apparatus 100a may control the application amount of the image processing for the owner user image according to the preset gain $Gm_n$ for the owner's image. With such control, for example, an image simulating the facial expression or emotion intended by the user Ua can be generated by adjusting the setting of the gain $Gm_n$ even in a case where the user Ua is uncomfortable taking an overreaction.

Furthermore, in the information processing system 1 according to the present embodiment, the information processing apparatus 100b may control the facial expression of the user Ua in the image transmitted from the information processing apparatus 100a in a case of presenting the image of the user Ua to the user Ub who uses the information processing apparatus 100b. Specifically, the information processing apparatus 100b analyzes the image (another's image) of the user Ua transmitted from the information processing apparatus 100a to estimate the facial expression of the user Ua. Next, the information processing apparatus 100b applies the image processing according to the estimation result of the facial expression to the another's image transmitted from the information processing apparatus 100a to adjust the facial expression of the user Ua in the another's image according to the estimation result of the facial expression, thereby generating the image of the user Ua to be presented to the user Ub. Furthermore, at this time, the information processing apparatus 100b may control the application amount of the image processing for the another's image according to the preset gain $Gom_n$ for the another's image. With such control, for example, the image of the user Ua in which the facial expression has been adjusted according to setting on the information processing apparatus 100a side is adjusted again in the facial expression according to the setting on the information processing apparatus 100b side, and then the image of the user Ua after adjustment is presented to the user Ub.

Figure 5:
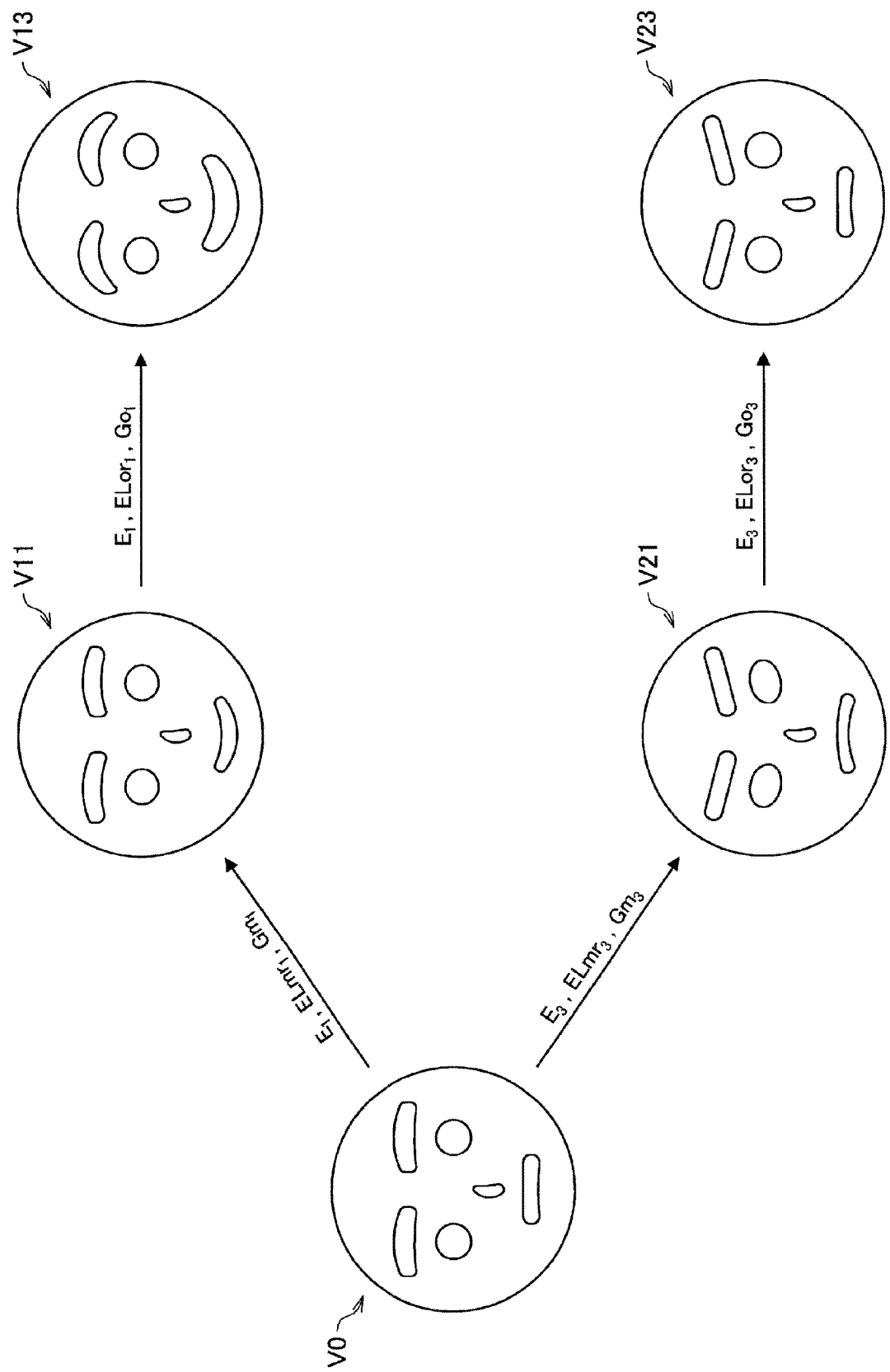
FIG. 5 is an explanatory diagram for describing an example of control by the information processing system according to the embodiment.

Here, a more specific example of the control regarding generation of the image reflecting the estimation result of the facial expression of the user in the information processing system 1 according to the present embodiment will be described with reference to FIG. 5. FIG. 5 is an explanatory diagram for describing an example of the control by the information processing system 1 according to the present embodiment. Note that the present description will be given focusing on the case of presenting the image (face image) of the user Ua reflecting the estimation result of the facial expression of the user Ua who uses the information processing apparatus 100a to the user Ub who uses the information processing apparatus 100b.

In FIG. 5, reference sign V0 represents an example of an image (for example, a face image of the user Ua) associated with the user Ua. In other words, the image processing according to the estimation result of the facial expression of the user Ua is applied to the face image V0, whereby the face image of the user Ua reflecting the estimation result of the facial expression is generated.

For example, it is assumed that the user Ua shows the facial expression of "joy $(E_1)$." In this case, the information processing apparatus 100a estimates a type $E_1$ of the facial expression of the user Ua and a facial expression level $ELmr_1$ of the facial expression on the basis of the detection result by the detection unit 195. Furthermore, the information processing apparatus 100a adjusts the facial expression level $ELmr_1$ on the basis of the gain $Gm_1$ for the owner's image according to the estimation result of the type $E_1$ of the facial expression, thereby calculating a facial expression level $ELma_1$ after adjustment. Next, the information processing apparatus 100a applies the image processing according to the estimated type $E_1$ of the facial expression to the face image V0 by the application amount according to the facial expression level $ELma_1$ after adjustment, thereby generating a face image V11 of the user Ua reflecting the estimation result of the facial expression of "joy $(E_1)$". Then, the information processing apparatus 100a transmits the image of the appearance of the user Ua reflecting the generated face image V11 of the user Ua to the information processing apparatus 100b via a predetermined network.

Furthermore, the information processing apparatus 100b acquires the image of the appearance of the user Ua reflecting the face image V11 transmitted from the information processing apparatus 100a via a predetermined network. The information processing apparatus 100b analyzes the acquired image to estimate the type $E_1$ of the facial expression of the user Ua and a facial expression level $ELor_1$ of the facial expression. Furthermore, the information processing apparatus 100b adjusts the facial expression level $ELor_1$ on the basis of a gain $Go_1$ for the another's image according to the estimation result of the type $E_1$ of the facial expression, thereby calculating a facial expression level $ELoa_1$ after adjustment. Next, the information processing apparatus 100a applies the image processing according to the estimated type $E_1$ of the facial expression to the face image V11 in the acquired image of the appearance of the user Ua by the application amount according to the facial expression level $ELoa_1$ after adjustment, thereby generating a face image V13 of the user Ua adjusted according to the estimation result of the facial expression of "joy $(E_1)$". Then, the information processing apparatus 100b presents the image of the appearance of the user Ua presenting the face image V13 with the adjusted facial expression to the user Ub via the output unit 191.

Furthermore, as another example, reference sign V21 represents an example of a face image of the user Ua generated by the information processing apparatus 100a in a case where the user Ua shows the facial expression of "anger $(E_3)$". In this case, the image processing based on a type $E_3$ of the facial expression of the user Ua and a facial expression level $ELmr_3$ of the facial expression estimated by the information processing apparatus 100a and a gain $Gm_3$ for the owner's image according to the type $E_3$ of the facial expression to the face image V0, whereby a face image V21 is generated.

Furthermore, reference sign V23 represents an example of a face image of the user Ua generated by applying adjustment of the facial expression to the face image V21 by the information processing apparatus 100b. In this case, the image processing based on a type $E_3$ of the facial expression of the user Ua and a facial expression level $ELor_3$ of the facial expression estimated by the information processing apparatus 100b and a gain $Gom_3$ for the another's image according to the type $E_3$ of the facial expression to the face image V21, whereby a face image V23 is generated.

With such control, for example, the information processing apparatus 100b emphasizes the facial expression of "joy $(E_1)$" of the user Ua when presenting the image of the user Ua reflecting the facial expression of "joy $(E_1)$" of the user Ua to the user Ub in the example illustrated in FIG. 5. Furthermore, as another example, the information processing apparatus 100b alleviates the facial expression of "anger $(E_3)$" of the user Ua when presenting the image of the user Ua reflecting the facial expression of "anger $(E_3)$" of the user Ua to the user Ub. As described above, according to the information processing system 1 of the present embodiment, the information processing apparatus 100b can control the facial expression of the user Ua according to setting on the information processing apparatus 100b side (for example, setting specified by the user Ub) when presenting the image of the user Ua to the user Ub.

Note that the functional configuration of the information processing apparatus 100 described with reference to FIG. 3 is merely an example, and the functional configuration of the information processing apparatus 100 is not necessarily limited to the example illustrated in FIG. 3 as long as the functional configuration can realize the above-described functions of the information processing apparatus 100. For example, a part of the configurations of the information processing apparatus 100 may be provided outside the information processing apparatus 100. As a specific example, the output unit 191, the detection unit 195, the input unit 197, and the like may be externally attached to the information processing apparatus 100. Furthermore, as another example, a part of the configurations of the owner's facial expression estimation unit 101, the owner's facial expression image control unit 103, the another's facial expression estimation unit 113, the another's facial expression image control unit 115, and the gain calculation unit 117 may be provided in another apparatus such as the server 800 as long as the part of the configurations can realize the flow of the series of processing by the configurations. Furthermore, in the above description, the example in which the compression processing is applied to the images in the case where the images of the users are transmitted or received between the information processing apparatuses 100 has been described. However, images to which no compression processing is applied may be transmitted or received between the information processing apparatuses 100. Note that, in this case, it goes without saying that the processing relating to compression of the images and the processing relating to decompression of the compressed images may not be executed.

Next, an example of the functional configuration of the information processing apparatus 100 according to the present embodiment will be described with reference to FIG. 3.

3.3. Processing

Next, an example of a flow of a series of processing of the information processing apparatus 100 according to the present embodiment will be described.

(Generation and Transmission of Owner's Image)

Figure 6:
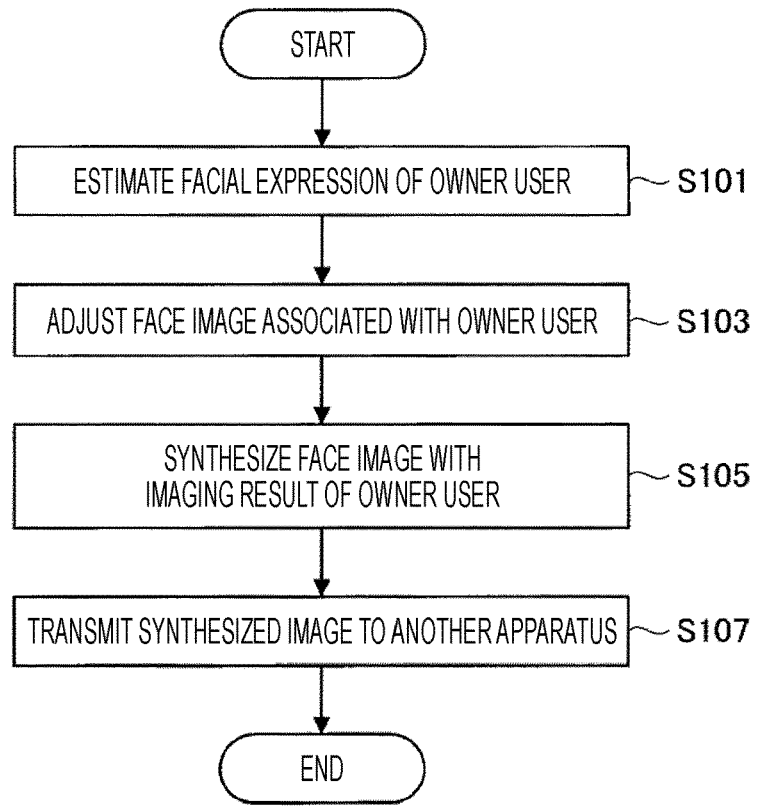
FIG. 6 is a flowchart illustrating an example of a flow of a series of processing of the information processing apparatus according to the embodiment.

First, processing in which the information processing apparatus 100 estimates the facial expression of the owner user and transmits the owner's image reflecting the estimation result to another apparatus (for example, another information processing apparatus 100, the server 800, or the like) will be described with reference to FIG. 6. FIG. 6 is a flowchart illustrating an example of a flow of a series of processing of the information processing apparatus 100 according to the present embodiment.

The information processing apparatus 100 (owner's facial expression estimation unit 101) acquires the information indicating the detection result of various states and situations of the user from the predetermined detection unit 195, and estimates the facial expression of the user on the basis of the acquired information. As a specific example, the information processing apparatus 100 estimates the type $E_n$ of the facial expression and the facial expression level $ELmr_n$ for the facial expression of the owner user (S101).

Next, the information processing apparatus 100 (owner's facial expression image control unit 103) applies the image processing according to the estimated type $E_n$ of the facial expression and facial expression level $ELmr_n$ to the image (owner user image) associated with the owner user to generate the owner user image (for example, the face image) reflecting the estimation result of the facial expression of the owner user. Furthermore, at this time, the information processing apparatus 100 may control the application amount of the image processing for the owner user image according to the preset gain $Gm_n$ for the owner's image (S103).

Next, the information processing apparatus 100 (owner's facial expression image control unit 103) acquires the image of the appearance of the owner user captured by the predetermined imaging unit 193 and applies the image analysis to the acquired image to estimate the position and direction of the face of the owner user in the image. Then, the information processing apparatus 100 synthesizes the owner user image (for example, the face image) reflecting the estimation result of the facial expression of the owner user with the image of the appearance of the owner user on the basis of the estimation result. With the synthesis, the image of the appearance of the owner user (in other words, the owner's image) reflecting the estimation result of the facial expression of the owner user is generated (S105).

Then, the information processing apparatus 100 (compression processing unit 105) applies the compression processing (encoding processing) based on the predetermined format to the generated owner's image, and transmits the data of the owner's image after the compression processing to another apparatus (for example, the another information processing apparatus 100, the server 800, or the like) via the predetermined network (S107).

As described above, the processing in which the information processing apparatus 100 estimates the facial expression of the owner user and transmits the owner's image reflecting the estimation result to another apparatus (for example, the another information processing apparatus 100, the server 800, or the like) has been described with reference to FIG. 6.

(Adjustment and Presentation of Another's Image)

Figure 7:
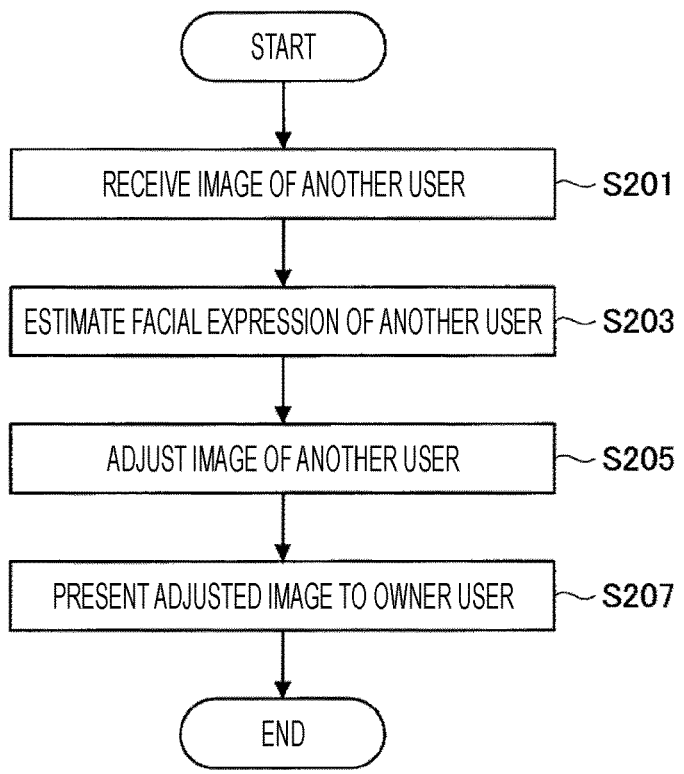
FIG. 7 is a flowchart illustrating an example of a flow of a series of processing of the information processing apparatus according to the embodiment.

Next, processing in which the information processing apparatus 100 presents another's image transmitted from another apparatus (for example, the another information processing apparatus 100, the server 800, or the like) to the owner user after adjusting a facial expression of another user in the another's image will be described with reference to FIG. 7. FIG. 7 is a flowchart illustrating an example of a flow of a series of processing of the information processing apparatus 100 according to the present embodiment.

The information processing apparatus 100 (decompression processing unit 111) acquires the data of the image of the appearance of another user (in other words, the another's image) generated by the another information processing apparatus 100 from the another apparatus (for example, the another information processing apparatus 100, the server 800, or the like) via the predetermined network. The information processing apparatus 100 applies the decompression processing (decoding processing) based on a predetermined format to the acquired data of the another's image to restore the another's image (S201).

Next, the information processing apparatus 100 (another's facial expression estimation unit 113) applies the image analysis processing to the restored another's image to estimate the position and direction of the face of the another user in the another's image, and extracts the face image of the another user (in other words, the another user image) from the another's image on the basis of the estimation result. Furthermore, the information processing apparatus 100 applies the image analysis processing to the extracted another user image to estimate the facial expression of the another user. As a specific example, the information processing apparatus 100 estimates the type $E_n$ of the facial expression and the facial expression level $ELor_n$ for the facial expression of the another user (S203).

Next, the information processing apparatus 100 (another's facial expression image control unit 115) applies the image processing according to the estimated type $E_n$ of the facial expression and facial expression level $ELmo_n$ to the face image of the another user (for example, the extracted another user image) in the another's image to generate the image of the another user reflecting the estimation result of the facial expression of the another user (in other words, to adjust the facial expression of the another user). Furthermore, at this time, the information processing apparatus 100 may control the application amount of the image processing for the face image of the another user according to the preset gain $Go_n$ for the another's image (S205).

Then, the information processing apparatus 100 (another's facial expression image control unit 115) presents the image of the another user reflecting the estimation result of the facial expression of the another user to the user via the output unit 191 (S207).

As described above, the processing in which the information processing apparatus 100 presents the another's image transmitted from another apparatus (for example, the another information processing apparatus 100, the server 800, or the like) to the owner user after adjusting the facial expression of the another user in the another's image has been described with reference to FIG. 7.

3.4. Modification

Next, modifications of the information processing system according to the present embodiment will be described.

First Modification

First, as a first modification, another example of the configuration of the information processing apparatus according to the present embodiment will be described. Note that, in the following description, the information processing apparatus according to the first modification may be referred to as an "information processing apparatus 100'" in order to be distinguished from the information processing apparatus according to the above-described embodiment.

Figure 8:
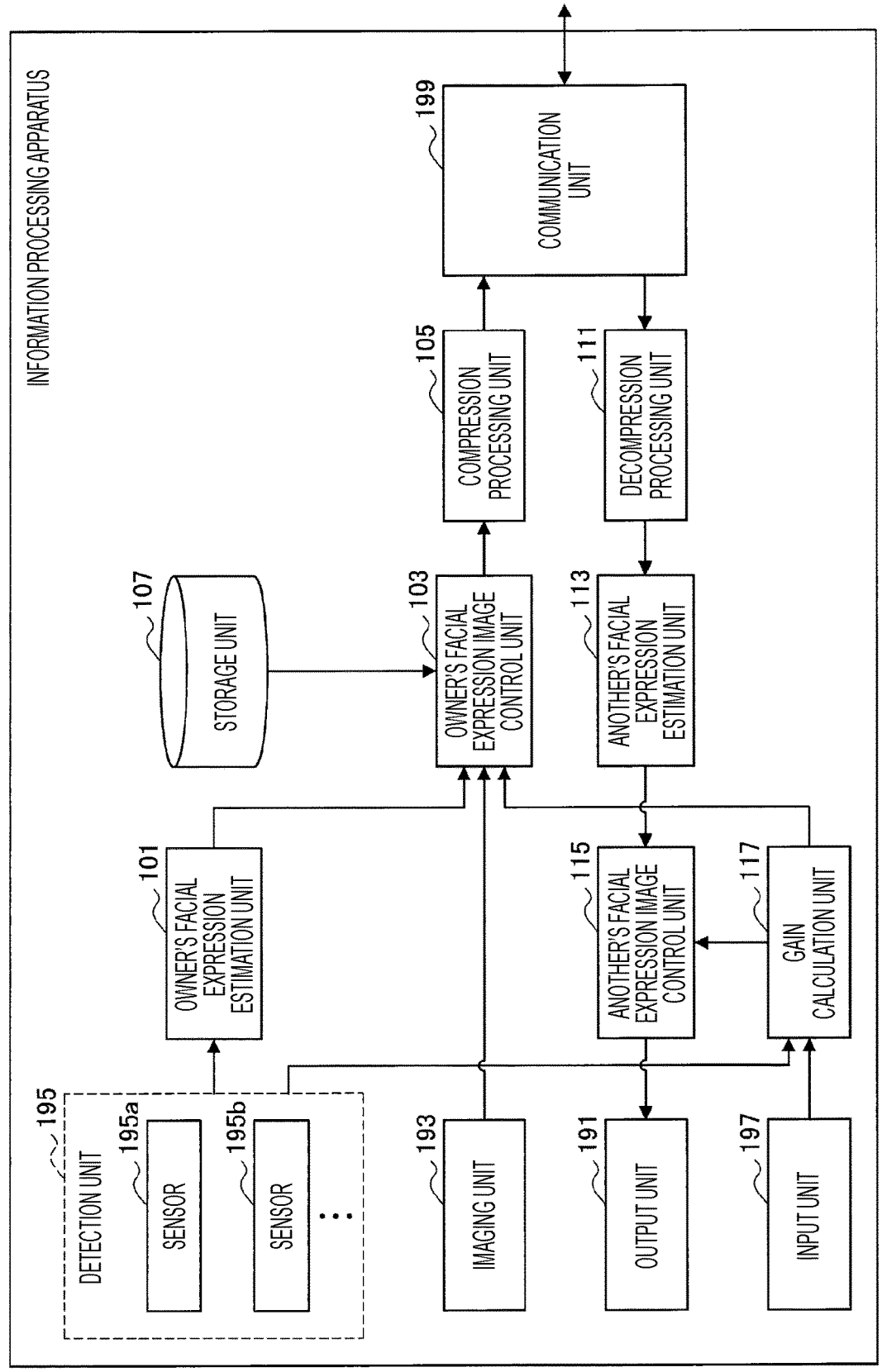
FIG. 8 is a block diagram illustrating an example of a functional configuration of an information processing apparatus according to a first modification.

For example, FIG. 8 is a block diagram illustrating an example of a functional configuration of an information processing apparatus according to the first modification. Note that the information processing apparatus 100' according to the first modification is different from the information processing apparatus 100 according to the above-described embodiment in the operation of the gain calculation unit 117. Therefore, in the present description, a configuration of the information processing apparatus 100' according to the first modification will be described focusing on the different portion from the information processing apparatus 100 according to the above-described embodiment, and detailed description of substantially similar portions to the information processing apparatus 100 is omitted.

In the information processing apparatus 100 according to the above-described embodiment, the gain calculation unit 117 has determined the gain $Gm_n$ for the owner's image and the gain $Go_n$ for the another's image on the basis of the user input via the input unit 197. In contrast, in the information processing apparatus 100' according to the first modification, the gain calculation unit 117 may determine the gain $Gm_n$ and the gain $Go_n$ according to a detection result of a predetermined state or situation.

For example, the gain calculation unit 117 may determine the gain $Gm_n$ and the gain $Go_n$ according to a predetermined state or situation detected by at least a part of the sensors included in the detection unit 195. As a more specific example, the gain calculation unit 117 may perform control such that fluctuation width of the gains $Gm_n$ and $Go_n$ becomes smaller in a case where the user is aware of fatigue on the basis of the detection result by the detection unit 195.

Furthermore, as another example, the gain calculation unit 117 may determine the gain $Go_n$ for the another's image according to an estimation result of the facial expression of the owner user. Similarly, the gain calculation unit 117 may determine the gain $Gm_n$ for the owner's image according to an estimation result of the facial expression of the another user. Furthermore, the gain calculation unit 117 may determine the gains $Gm_n$ and $Go_n$ according to a user input via the input unit 197 and the detection result of the predetermined state or situation. As a specific example, the gain calculation unit 117 may determine initial values of the gains $Gm_n$ and $Go_n$ according to the user input via the input unit 197 and may dynamically control the gains $Gm_n$ and $Go_n$ according to the detection result of the predetermined state or situation with the initial values as references.

Furthermore, the gain controlled by the gain calculation unit 117 according to the detection result of the predetermined state or situation may be a part or all of the gains $Gm_n$ and $Go_n$ defined for each type $E_n$ of the facial expression. Furthermore, the gain calculation unit 117 may apply different control to a part of the gains $Gm_n$ and $Go_n$ defined for each type $E_n$ of the facial expression from other gains $Gm_n$ and $Go_n$.

Furthermore, the gain calculation unit 117 may determine the gains $Gm_n$ and $Go_n$ according to predetermined setting. For example, it may be assumed that facial expression differences may occur depending on cultural differences. Assuming such a situation, the gain calculation unit 117 may control the gains $Gm_n$ and $Go_n$ such that at least a part of facial expression or facial expression of emotion is further suppressed (or exaggerated) according to the setting regarding a culture area, for example. The predetermined setting may be defined on the basis of diversity information regarding at least one of a race, a gender, an age, or a nationality in addition to the culture area.

Of course, it is needless to say that the gain calculation unit 117 may determine the gains $Gm_n$ and $Go_n$ on the basis of the user input via the input unit 197, similarly to the case of the information processing apparatus 100 according to the above-described embodiment.

Another example of the configuration of the information processing apparatus according to the present embodiment has been described above as the first modification with reference to FIG. 8.

Second Modification

Next, as a second modification, another example of the configuration of the information processing system according to the present embodiment will be described. Note that, in the following description, the information processing apparatus according to the second modification may be referred to as an "information processing apparatus 200" in order to be distinguished from the information processing apparatuses according to the above-described embodiment and another modification.

In the information processing system according to the above-described embodiment, each information processing apparatus 100 has applied the image analysis to the image of the another user (in other words, another's image) to estimate the facial expression of the another user. In contrast, in the information processing system according to the second modification, an estimation result of the facial expression of the owner user by each information processing apparatus 200 is managed on the server 800 side. With such a configuration, in the information processing system according to the second modification, the information processing apparatus 200 can acquire the estimation result of the facial expression of the another user from the server 800 without estimating the facial expression of the another user by the information processing apparatus 200 itself. Furthermore, the information processing system according to the second modification may manage both the gain $Gm_n$ for the owner's image and the gain $Go_n$ for the another's image on the server 800 side. Therefore, an example of a more detailed configuration of the information processing apparatus 200 according to the second modification will be described below.

Figure 9:
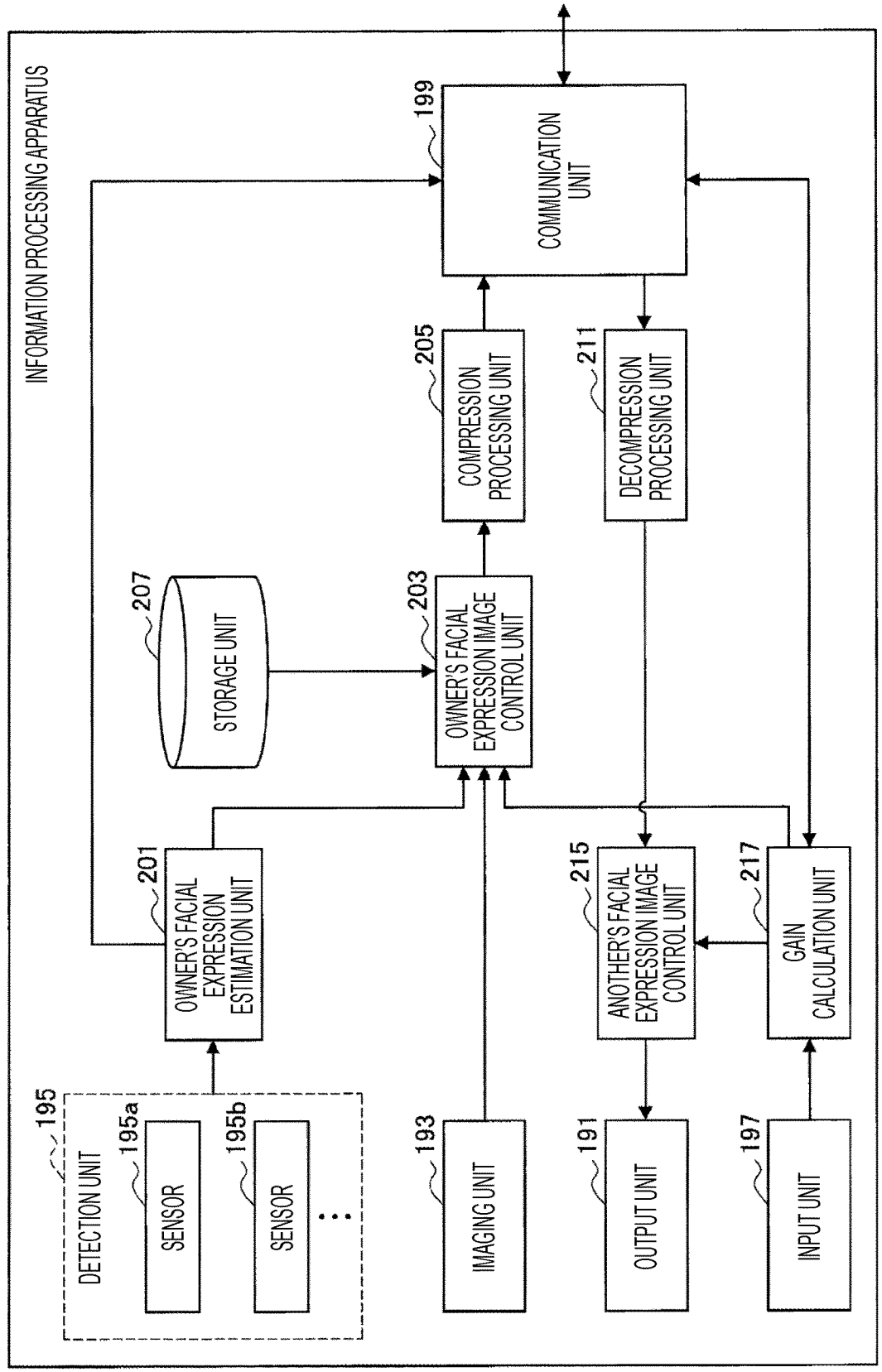
FIG. 9 is a block diagram illustrating an example of a functional configuration of an information processing apparatus according to a second modification.

For example, FIG. 9 is a block diagram illustrating an example of a functional configuration of the information processing apparatus 200 according to the second modification. As illustrated in FIG. 9, the information processing apparatus 200 according to the second modification includes the output unit 191, the input unit 197, the imaging unit 193, the detection unit 195, the communication unit 199, and an owner's facial expression estimation unit 201, an owner's facial expression image control unit 203, a storage unit 207, another's facial expression image control unit 215, and a gain calculation unit 217. Furthermore, the information processing apparatus 200 may also include a compression processing unit 205 and a decompression processing unit 211.

Note that the output unit 191, the input unit 197, the imaging unit 193, the detection unit 195, and the communication unit 199 are similar to those of the information processing apparatus 100 (see FIG. 3) according to the above-described embodiment. Furthermore, the owner's facial expression estimation unit 201, the owner's facial expression image control unit 203, the storage unit 207, the another's facial expression image control unit 215, and the gain calculation unit 217 respectively correspond to the owner's facial expression estimation unit 101, the owner's facial expression image control unit 103, the storage unit 107, the another's facial expression image control unit 115, and the gain calculation unit 117 in the information processing apparatus 100 according to the above-described embodiment. Therefore, in the present description, a functional configuration of the information processing apparatus 200 according to the second modification will be described focusing on different portions from the information processing apparatus 100 according to the above-described embodiment, and detailed description of substantially similar portions to the information processing apparatus 100 is omitted.

The owner's facial expression estimation unit 201 acquires the information indicating the detection result of various states and situations of the user from the detection unit 195, and estimates the facial expression of the user on the basis of the acquired information. As a specific example, the owner's facial expression estimation unit 201 estimates the type $E_n$ of the facial expression and the facial expression level $ELmr_n$ on the basis of the information acquired from the detection unit 195. Then, the owner's facial expression estimation unit 201 outputs information indicating the estimation result of the type $E_n$ of the facial expression and the facial expression level $ELmr_n$ to the owner's facial expression image control unit 203. Furthermore, the owner's facial expression estimation unit 201 transmits the information indicating the estimation result of the type $E_n$ of the facial expression and the facial expression level $ELmr_n$ to the server 800 via a predetermined network.

The gain calculation unit 217 may determine the gain $Gm_n$ for the owner's image and the gain $Go_n$ for the another's image according to a predetermined condition and transmit information indicating the determined gains $Gm_n$ and $Go_n$ to the server 800 via a predetermined network. With the transmission, the gains $Gm_n$ and $Go_n$ are managed by the server 800. Furthermore, as another example, the information indicating the gains $Gm_n$ and $Go_n$ may be managed in the server 800 in advance for each information processing apparatus 200 (that is, for each user who uses the information processing apparatus 200).

The gain calculation unit 217 may acquire the information indicating the gain $Gm_n$ managed in the server 800 from the server 800 via a predetermined network and output the acquired information indicating the gain $Gm_n$ to the owner's facial expression image control unit 203. Similarly, the gain calculation unit 217 may acquire the information indicating the gain $Go_n$ managed in the server 800 from the server 800 via a network and output the acquired information indicating the gain $Go_n$ to the another's facial expression image control unit 215. Note that the gains $Gm_n$ and $Go_n$ acquired at this time may be controlled by the server 800 according to a predetermined condition. Note that an example of the control of the gains $Gm_n$ and $Go_n$ by the server 800 will be described below in detail.

The owner's facial expression image control unit 203 has a configuration for generating the image of the owner user (in other words, the owner's image) reflecting the estimation result of the facial expression of the owner user. Note that processing regarding the generation of the owner's image by the owner's facial expression image control unit 203 is similar to that in the owner's facial expression image control unit 103 in the information processing apparatus 100 according to the above-described embodiment.

In other words, the owner's facial expression image control unit 203 applies the image processing to the owner user image stored in the storage unit 207 on the basis of the estimation result of the type $E_n$ of the facial expression and the facial expression level $ELmr_n$ by the owner's facial expression estimation unit 201 and the gain $Gm_n$ output from the gain calculation unit 217, thereby generating the owner user image reflecting the estimation result of the facial expression of the owner user. Furthermore, the owner's facial expression image control unit 203 synthesizes the owner user image reflecting the estimation result of the facial expression of the owner user with the image of the appearance of the owner user captured by the imaging unit 193, thereby generating the image of the appearance of the owner user (in other words, the owner's image) reflecting the estimation result of the facial expression of the owner user. Then, the owner's facial expression image control unit 203 outputs data of the generated owner's image to the compression processing unit 205.

The compression processing unit 205 is substantially similar to the compression processing unit 105 in the information processing apparatus 100 according to the above-described embodiment. In other words, the compression processing unit 205 acquires the data of the generated owner's image from the owner's facial expression image control unit 203, and applies compression processing (encoding processing) based on a predetermined format to the acquired data of the owner's image. Then, the compression processing unit 205 transmits the data of the owner's image to which the compression processing has been applied to the server 800 via a predetermined network. Note that the data of the owner's image transmitted to the server 800 is transmitted to another information processing apparatus 100 that will be a communication partner of the information processing apparatus 100 by the server 800.

The decompression processing unit 211 acquires data of an image of the appearance of another user (in other words, another's image) generated by the another information processing apparatus 100, and information indicating an estimation result of the facial expression of the another user (in other words, the type $E_n$ of the facial expression and the facial expression level $ELor_n$) from the server 800 via a predetermined network. The decompression processing unit 211 applies decompression processing (decoding processing) based on a predetermined format to the acquired data of the another's image to restore the another's image. Then, the decompression processing unit 211 outputs data of the restored another's image and the acquired information indicating the estimation result of the facial expression of the another user to the another's facial expression image control unit 215.

The another's facial expression image control unit 215 is a configuration for generating the image of the another user to be presented to the owner user by adjusting the facial expression of the another user presented in the another's image on the basis of a predetermined condition. Note that processing regarding the generation of the image of the another user to be presented to the owner user by the another's facial expression image control unit 215 is similar to that of the another's facial expression image control unit 115 in the information processing apparatus 100 according to the above-described embodiment.

In other words, the another's facial expression image control unit 215 applies the image processing to the another's image acquired from the server 800 on the basis of the estimation result of the facial expression of the another user (in other words, the estimation result of the type $E_n$ of the facial expression and the facial expression level $ELor_n$) acquired from the server 800, and the information indicating the gain $Go_n$ output from the gain calculation unit 217. By the processing, the image of the another user reflecting the estimation result of the facial expression of the another user (in other words, the image with the adjusted facial expression of the another user) is generated. Then, the another's facial expression image control unit 215 presents the image of the another user reflecting the estimation result of the facial expression of the another user to the user via the output unit 191.

Next, an example of control of the gains $Gm_n$ and $Go_n$ by the server 800 in the information processing system according to the second modification will be described with reference to FIG. 10. FIG. 10 is an explanatory diagram for describing an example of gain control in the information processing system according to the second modification.

In the example illustrated in FIG. 10, a role is set to each user, and the server 800 controls at least a part of the gains $Gm_n$ and $Go_n$ set for each type $E_n$ of the facial expression for the each user according to the role set to the user. Specifically, in the example illustrated in FIG. 10, a role of "teacher" is set to the user Ua and a role of "student" is set to the user Ub. The server 800 may control the gain corresponding to the user according to the role set to the user on the basis of such a configuration.

As a more specific example, in a case where the user Ua who plays the role of "teacher" checks the facial expression of the user Ub to which the role of "student" is set, it may be assumed that it is desirable that the user Ua can confirm the facial expression of the user Ub in a state where the estimation result of the emotion of the user Ub is more faithfully reflected (in other words, in a state where the facial expression is not exaggerated with gains). Furthermore, in a case where the facial expression of the user Ua who plays the role of "teacher" is presented to the user Ub to which the role of "student" is set, it may be assumed that it is desirable that the facial expression of the user Ua is presented in a state where the estimation result of the emotion of the user Ua is more faithfully reflected (in other words, in a state where the facial expression is not exaggerated with gains). In view of such a situation, the server 800 may control the gains $Gm_n$ and $Go_n$ set for each user according to the role set to each user.

For example, in the example illustrated in FIG. 10, in a case where the image of the user Ua is presented to the user Ub in an information processing apparatus 200b used by the user Ub, the gain $Go_n$ corresponding to the user Ub is controlled by the server 800 such that the gain to be finally applied to the image of the user Ua is limited in a range of 0.8 to 1.1 (in other words, a limiter (upper limit value and/or lower limit value) is provided). For example, in an information processing apparatus 200a used by the user Ua, a gain $Gm_3$ corresponding to "anger ($E_3$)", of the gains $Gm_n$ applied to the image of the user Ua, is set to "1.2". In other words, the gain $Gm_3$ is set such that the facial expression of "anger" is more exaggerated. Therefore, in the information processing apparatus 200b used by the user Ub, a gain $Go_3$ corresponding to "anger ($E_3$)", of the gain $Go_n$ in the setting of the gain corresponding to the user Ub, is set to "0.92" so that the gain to be finally applied to the image of the user Ua is controlled to fall in the range of 0.8 to 1.1 (in other words, $0.8 \leq Gm_3 \times Go_3 \leq 1.1$).

Similarly, in the example illustrated in FIG. 10, in a case where the image of the user Ub is presented to the user Ua in the information processing apparatus 200a used by the user Ua, the gain $Go_n$ corresponding to the user Ua is controlled by the server 800 such that the gain to be finally applied to the image of the user Ub is limited in the range of 0.8 to 1.1. For example, in an information processing apparatus 200b used by the user Ub, a gain $Gm_6$ corresponding to "disgust ($E_3$)", of the gain $Gm_n$ applied to the image of the user Ub, is set to "0.2". In other words, the gain $Gm_6$ is set such that the facial expression of "disgust" is less easily expressed. Therefore, in the information processing apparatus 200a used by the user Ua, a gain $Go_6$ corresponding to "disgust ($E_3$)", of the gain $Go_n$ in the setting of the gain corresponding to the user Ua, is controlled to "4.0" so that the gain to be finally applied to the image of the user Ub is controlled to fall in the range of 0.8 to 1.1 (in other words, $0.8 \leq Gm_6 \times Go_6 \leq 1.1$).

Furthermore, the server 800 may disable the setting of at least a part of the gains $Gm_n$ and $Go_n$ set for each type $E_n$ of the facial expression for each user. In this case, the server 800 may set the corresponding gain to "1.0".

Furthermore, the above-described function regarding the control of the gain by the server 800 may be selectively controlled to be enabled or disabled according to a predetermined condition (for example, an operation by the administrator). Furthermore, the setting regarding control of at least a part of the above-described control of the gain by the server 800 may be changed according to a predetermined condition.

Note that the configuration of the information processing system according to the second modification described above is merely an example, and the configurations of the information processing apparatus 200 and the server 800 are not necessarily limited to the above-described example as long as the functions of the information processing apparatus 200 and the server 800 are realized. For example, at least a part of the configurations of the information processing apparatus 200 may be provided on the server 800 side.

As a specific example, the configuration corresponding to the owner's facial expression estimation unit 201 may be provided in the server 800. In this case, the information processing apparatus 200 may just transmit information indicating the detection result by the detection unit 195 to the server 800. Furthermore, the server 800 may just estimate the facial expression of the user who uses the information processing apparatus 200 on the basis of the information transmitted from the information processing apparatus 200. Furthermore, at this time, the server 800 may determine the gains $Gm_n$ and $Go_n$ corresponding to the user of the information processing apparatus 200 on the basis of the information transmitted from the information processing apparatus 200 (in other words, the information indicating the detection result by the detection unit 195), similarly to the example described with reference to FIG. 8.

Furthermore, the configuration corresponding to the owner's facial expression image control unit 203 may be provided in the server 800, and the image associated with the user who uses the information processing apparatus 200 (in other words, the owner user image) may be held on the server 800 side. In this case, the information processing apparatus 200 may just transmit the image of the appearance of the user captured by the imaging unit 193 to the server 800. Furthermore, the server 800 may just generate a face image reflecting the facial expression of the user according to the estimation result of the facial expression of the user and synthesize the face image with the image transmitted from the information processing apparatus 200, thereby generating an image reflecting the facial expression of the user (in other words, an image corresponding to the owner's image).

Similarly, the configuration corresponding to the another's facial expression image control unit 215 may be provided in the server 800. In this case, the server 800 may just adjust the facial expression of the user in the owner's image corresponding to the user of the information processing apparatus 200 as a transmission source according to the gain $Go_n$ corresponding to another information processing apparatus 200 as a transmission destination, and transmit the image after adjustment to the another information processing apparatus 200. Note that, in this case, the control regarding transmission of the image after adjustment from the server 800 to the another information processing apparatus 200 corresponds to an example of control regarding presentation of the image after adjustment to the user of the another information processing apparatus 200, in the server 800. Furthermore, the another information processing apparatus 200 may just present the image transmitted from the server 800 (in other words, the image corresponding to the another's image after adjustment) to the owner user via the output unit 191. In this case, the control regarding the presentation of the image by the another information processing apparatus 200 via the output unit 191 corresponds to an example of control regarding presentation of the image to the owner user, in the another information processing apparatus 200.

Furthermore, in the above description, an example in which the image to which the image processing according to the gain $Gm_n$ corresponding to the another information processing apparatus 200 side as a transmission source has been applied is transmitted as the image of the another user (in other words, the another's image) to the information processing apparatus 200 has been described. On the other hand, the image processing according to the gain $Gm_n$ may be executed on the information processing apparatus 200 side as a transmission destination. In this case, for example, the image (in other words, the another user image) associated with the user (in other words, the another user) of the another information processing apparatus 200 as a transmission source, the estimation result of the facial expression of the another user, and the information indicating the gain $Gm_n$ corresponding to the another user may just be transmitted to the information processing apparatus 200 as a transmission destination. Note that, with such a configuration, the information processing apparatus 200 as a transmission destination can easily reproduce the another's image not reflecting the estimation result of the facial expression of the another user.

Another example of the configuration of the information processing system according to the present embodiment has been described above as the second modification with reference to FIGS. 9 and 10.

Third Modification

Next, as a third modification, another example of the configuration of the information processing system according to the present embodiment will be described. In the third modification, an example of the configuration of the information processing system in a case where each two of three or more users communicate with each other will be described. Note that, in the following description, the information processing apparatus according to the third modification may be referred to as an "information processing apparatus 300" in order to be distinguished from the information processing apparatuses according to the above-described embodiment and other modifications. Furthermore, it is assumed that, in the present description, the information processing system according to the third modification is configured such that the estimation result of the facial expression of the owner user by each information processing apparatus 300 is managed on the server 800 side, similarly to the information processing system according to the second modification.

Figure 11:
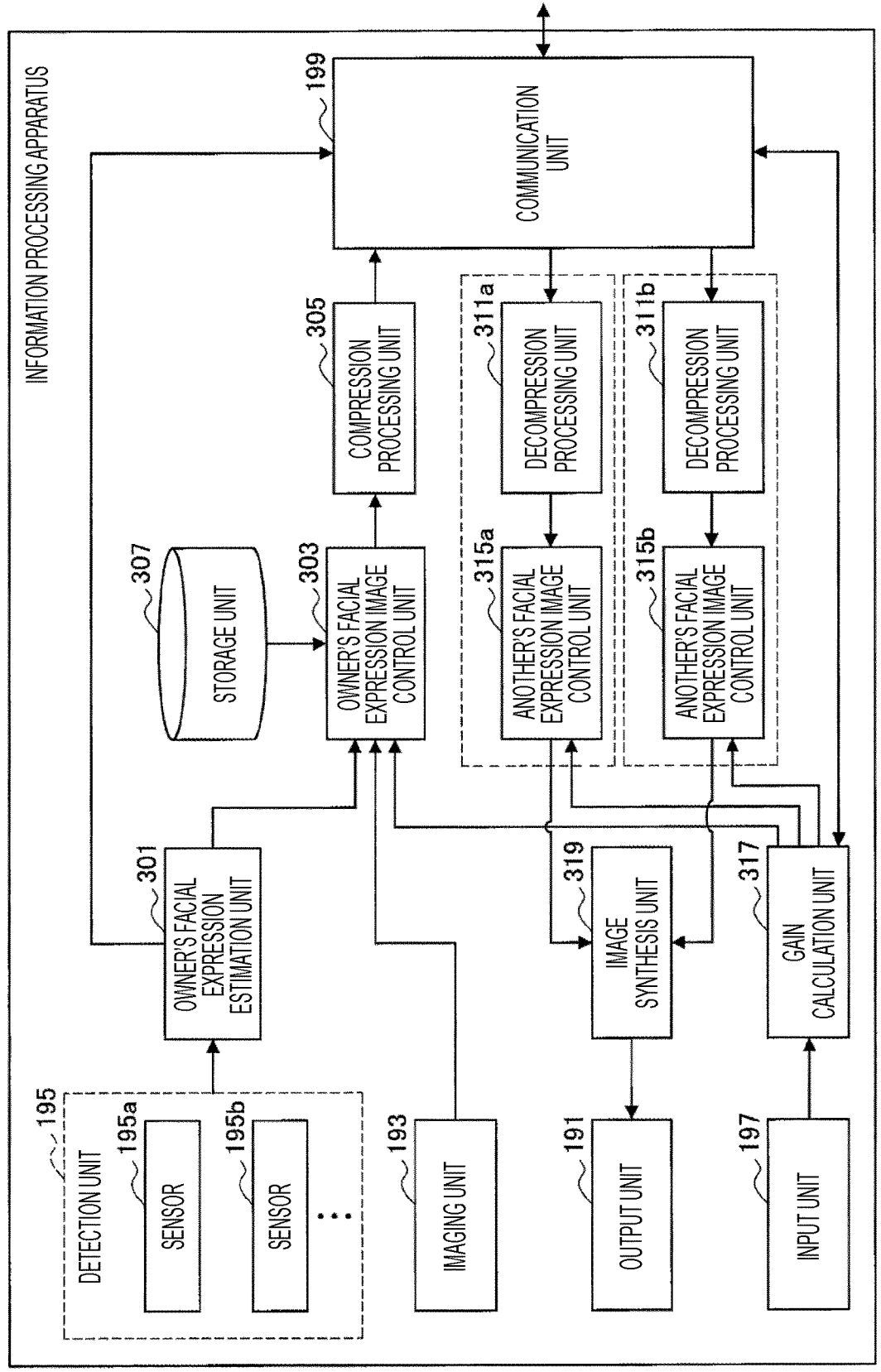
FIG. 11 is a block diagram illustrating an example of a functional configuration of an information processing apparatus 300 according to a third modification.

For example, FIG. 11 is a block diagram illustrating an example of the functional configuration of the information processing apparatus 300 according to the third modification. As illustrated in FIG. 11, the information processing apparatus 300 according to the third modification includes the output unit 191, the input unit 197, the imaging unit 193, the detection unit 195, the communication unit 199, an owner's facial expression estimation unit 301, an owner's facial expression image control unit 303, a storage unit 307, a plurality of another's facial expression image control units 315, and the gain calculation unit 217. For example, in the example illustrated in FIG. 11, the information processing apparatus 300 includes another's facial expression image control units 315a and 315b, as the plurality of another's facial expression image control units 315. Furthermore, the information processing apparatus 300 may include a compression processing unit 305 and a plurality of decompression processing units 311. For example, in the example illustrated in FIG. 11, the information processing apparatus 300 includes decompression processing units 311a and 311b as the plurality of decompression processing units 311.

Note that the output unit 191, the input unit 197, the imaging unit 193, the detection unit 195, and the communication unit 199 are similar to those of the information processing apparatus 100 (see FIG. 3) according to the above-described embodiment. Furthermore, the owner's facial expression estimation unit 301, the owner's facial expression image control unit 303, the storage unit 307, and the compression processing unit 305 are substantially similar to the owner's facial expression estimation unit 201, the owner's facial expression image control unit 203, the storage unit 207, and the compression processing unit 205 in the information processing apparatus 200 according to the second modification. Therefore, in the present description, a functional configuration of the information processing apparatus 300 according to the third modification will be described focusing on different portions from the information processing apparatus 200 according to the above-described second modification, and detailed description of substantially similar portions to the information processing apparatus 200 is omitted.

Furthermore, in the present description, for simplicity of the characteristics of the information processing apparatus 300 according to the third modification, description will be given focusing on an example of a case where images of the users are transmitted and received among information processing apparatuses 300a to 300c respectively used by users Ua to Uc as necessary.

In the information processing apparatus 300 according to the third modification, images (in other words, other's images) of the users using other information processing apparatuses 300 respectively transmitted from the other information processing apparatuses 300 different from one another are individually adjusted according to settings (for example, gains $Go_n$ or the like) corresponding to the users.

As a specific example, it is assumed that the information processing apparatus 300c used by the user Uc applies adjustment of facial expressions of the users in the other's images to the other's images corresponding to the users Ua and Ub transmitted from the information processing apparatuses 300a and 300b, and presents the other's images after adjustment to the user Uc. In this case, it is assumed that, for example, the decompression processing unit 311a and the another's facial expression image control unit 315a handle the another's image corresponding to the User Ua as a processing object, and the decompression processing unit 311b and the another's facial expression image control unit 315b handle the another's image corresponding to the User Ub as a processing object.

Furthermore, a gain calculation unit 317 acquires information indicating the gain $Go_n$ corresponding to the user Ua managed in the server 800 from the server 800 via a predetermined network, and outputs the acquired information indicating the gain $Go_n$ to the another's facial expression image control unit 315a. Furthermore, a gain calculation unit 317 acquires information indicating the gain $Go_n$ corresponding to the user Ub managed in the server 800 from the server 800 via a predetermined network, and outputs the acquired information indicating the gain $Go_n$ to the another's facial expression image control unit 315b.

The decompression processing unit 311a acquires data of the image of the appearance of the user Ua (in other words, the another's image corresponding to the user Ua) generated by the information processing apparatus 300a, and information indicating the estimation result of the facial expression of the user Ua (in other words, the estimation result of the type $E_n$ of the facial expression and the facial expression level $ELor_n$) from the server 800 via a predetermined network. The decompression processing unit 311a applies decompression processing (decoding processing) based on a predetermined format to the acquired data of the another's image corresponding to the user Ua to restore the another's image corresponding to the user Ua. Then, the decompression processing unit 311a outputs data of the restored another's image corresponding to the user Ua and the acquired information indicating the estimation result of the facial expression of the user of the user Ua to the another's facial expression image control unit 315a.

The another's facial expression image control unit 315a acquires the data of the another's image corresponding to the user Ua and the information indicating the estimation result of the facial expression of the user Ua from the decompression processing unit 311a. Furthermore, the another's facial expression image control unit 315a acquires the information indicating the gain $Go_n$ corresponding to the user Ua from the gain calculation unit 317. Next, the another's facial expression image control unit 315a applies the image processing to the another's image corresponding to the user Ua on the basis of the information indicating the estimation result of the facial expression of the user Ua and the information indicating the gain $Go_n$ corresponding to the user Ua, thereby generating an image of the user Ua reflecting the estimation result of the facial expression of the user Ua (in other words, an image with the adjusted facial expression of the user Ua) Then, the another's facial expression image control unit 315a outputs the generated image of the user Ua, in other words, the image of the appearance of the user Ua reflecting the estimation result of the facial expression of the user Ua to an image synthesis unit 319.

Furthermore, the decompression processing unit 311b acquires data of the image of the appearance of the user Ub (in other words, the another's image corresponding to the user Ub) generated by the information processing apparatus 300b, and information indicating the estimation result of the facial expression of the user Ub (in other words, the estimation result of the type $E_n$ of the facial expression and the facial expression level $ELor_n$) from the server 800 via a predetermined network. The decompression processing unit 311b applies decompression processing (decoding processing) based on a predetermined format to the acquired data of the another's image corresponding to the user Ub to restore the another's image corresponding to the user Ub. Then, the decompression processing unit 311b outputs data of the restored another's image corresponding to the user Ub and the acquired information indicating the estimation result of the facial expression of the user of the user Ua to the another's facial expression image control unit 315b.

The another's facial expression image control unit 315b acquires the data of the another's image corresponding to the user Ub and the information indicating the estimation result of the facial expression of the user Ub from the decompression processing unit 311b. Furthermore, the another's facial expression image control unit 315b acquires the information indicating the gain $Go_n$ corresponding to the user Ub from the gain calculation unit 317. Next, the another's facial expression image control unit 315b applies the image processing to the another's image corresponding to the user Ub on the basis of the information indicating the estimation result of the facial expression of the user Ub and the information indicating the gain $Go_n$ corresponding to the user Ub, thereby generating an image of the user Ub reflecting the estimation result of the facial expression of the user Ub (in other words, an image with the adjusted facial expression of the user Ub). Then, the another's facial expression image control unit 315b outputs the generated image of the user Ub, in other words, the image of the appearance of the user Ub reflecting the estimation result of the facial expression of the user Ub to the image synthesis unit 319.

The image synthesis unit 319 acquires the image of the appearance of the user Ua reflecting the estimation result of the facial expression of the user Ua from the another's facial expression image control unit 315a. Furthermore, the image synthesis unit 319 acquires the image of the appearance of the user Ub reflecting the estimation result of the facial expression of the user Ub from the another's facial expression image control unit 315b. Next, the image synthesis unit 319 synthesizes the acquired images of the appearances of the users Ua and Ub on the basis of a predetermined condition, thereby generating an image in which the appearances of the respective users Ua and Ub are presented, and reflecting the estimation results of the facial expressions of the respective users Ua and Ub. Then, the image synthesis unit 319 presents the generated image, in other words, the image in which the appearances of the respective users Ua and Ub are presented to the owner user (in other words, the user Uc) via the output unit 191.

Note that the method of synthesizing the acquired images of the other users by the image synthesis unit 319 may be appropriately set according to a use scene of the information processing system according to the third modification. For example, in a case of assuming communication among the users Ua to Uc in a virtual space, the image synthesis unit 319 may synthesize the respective images of the users Ua and Ub with an image in the virtual space according to positional relationship among the users Ua to Uc in the virtual space, thereby generating the image to be presented to the user Uc.

Furthermore, FIG. 11 merely illustrates a logical functional configuration of the information processing apparatus 300, and does not necessarily limit a physical hardware configuration of the information processing apparatus 300. Specifically, devices for performing various operations such as ICs or processors may not be individually provided in the decompression processing unit 311a and the another's facial expression image control unit 315a, and in the decompression processing unit 311b and the another's facial expression image control unit 315b. For example, the processing by the decompression processing unit 311a and the another's facial expression image control unit 315a and the processing by the decompression processing unit 311b and the another's facial expression image control unit 315b may be executed by a single processor.

Furthermore, the respective logical configurations of the decompression processing units 311a and 311b, and the another's facial expression image control units 315a and 315b are also not limited. For example, the decompression processing units 311a and 311b may be configured as one decompression processing unit 311, and the decompression processing unit 311 may apply the decompression processing (decoding processing) to each of data of the other's images corresponding to the plurality of users, thereby individually restoring the other's images corresponding to the users. Similarly, the another's facial expression image control units 315a and 315b may be configured as one another's facial expression image control unit 315, and the another's facial expression image control unit 315 applies the image processing to the other's images corresponding to the users, thereby individually generating the images reflecting the estimation results of the facial expressions of the users. Furthermore, the configurations corresponding to the decompression processing unit 311 and the another's facial expression image control unit 315 may be additionally provided as appropriate according to the number of users to be objects for communication.

Next, an example of control of gains $Gm_n$ and $Go_n$ by the server 800 in the information processing system according to the third modification will be described with reference to FIG. 12. FIG. 12 is an explanatory diagram for describing an example of gain control in the information processing system according to the third modification.

In the example illustrated in FIG. 12, similarly to the example described with reference to FIG. 10, a role is set to each user, and the server 800 controls at least a part of the gains $Gm_n$ and $Go_n$ set for each type $E_n$ of the facial expression for the each user according to the role set to the user. Specifically, in the example illustrated in FIG. 12, a role of "teacher" is set to the user Ua and a role of "student" is set to the users Ub and Uc. The server 800 may control the gain corresponding to the user according to the role set to the user on the basis of such a configuration.

Note that, as illustrated in FIG. 12, in a case of assuming communication among three or more users, the gain $Go_n$ for the another's image may be individually set to each user who may become a partner of the communication. As a specific example, in the case of the setting corresponding to the user Ua, the gain $Go_n$ corresponding to the user Ub and the gain $Go_n$ corresponding to the user Uc may be individually set. The same applies to settings corresponding to the users Ub and Uc.

Furthermore, similarly to the example described with reference to FIG. 10, the gains $Gm_n$ and the gains $Go_n$ corresponding to the users may be controlled such that the gains to be finally applied to the respective images of the users are limited to fall within a predetermined range according to the respective roles of the users who perform communication. As a specific example, in the example illustrated in FIG. 12, the gains $Go_n$ corresponding to the users are controller such that the gains to be finally applied to the images of the users are limited to fall within the range of 0.8 to 1.1 between the user Ua playing the role of "teacher", and the users Ub and Uc playing the roles of "students".

For example, in an information processing apparatus 200a used by the user Ua, a gain $Gm_3$ corresponding to "anger $(E_3)$", of the gains $Gm_n$ applied to the image of the user Ua, is set to "1.2". In other words, the gain $Gm_3$ is set such that the facial expression of "anger" is more exaggerated. Therefore, in the information processing apparatus 200b used by the user Ub, a gain $Go_3$ corresponding to "anger $(E_3)$", of the gain $Go_n$ set to the user Ua in the setting of the gain corresponding to the user Ub, is set to "0.92" so that the gain to be finally applied to the image of the user Ua is controlled to fall in the range of 0.8 to 1.1 (in other words, $0.8 \leq Gm_3 \times Go_3 \leq 1.1$).

Furthermore, as another example, in an information processing apparatus 200b used by the user Ub, a gain $Gm_6$ corresponding to "disgust $(E_3)$", of the gain $Gm_n$ to be applied to the image of the user Ub, is set to "0.2". In other words, the gain $Gm_6$ is set such that the facial expression of "disgust" is less easily expressed. Therefore, in the information processing apparatus 200a used by the user Ua, a gain $Go_6$ corresponding to "disgust $(E_3)$", of the gain $Go_n$ set to the user Ub in the setting of the gain corresponding to the user Ua, is controlled to "4.0" so that the gain to be finally applied to the image of the user Ub is controlled to fall in the range of 0.8 to 1.1 (in other words, $0.8 \leq Gm_6 \times Go_6 \leq 1.1$).

Meanwhile, the above-described control of the gains may not be performed between the users Ub and Uc who play the roles of "students". For example, in the example illustrated in FIG. 12, in the setting of the gains corresponding to the user Ub, the gain $Go_n$ set to the user Uc is not controlled by the server 800, and the value set in advance by the user Ub may be applied as it is. This similarly applies to the gain $Go_n$ set to the user Ub, in the setting of the gains corresponding to the user Uc.

Note that the above description is merely an example, and does not necessarily limit the control of the gains by the server 800. For example, the control by the server 800 is not limited to the above-described control according to the role set to each user, and the server 800 may individually control the gain for each user. As a specific example, the server 800 may selectively change content of gain control between communication between the users Ua and Ub and communication between the users Ua and Uc.

Furthermore, the configuration of the information processing system according to the third modification is merely an example, and the configurations of the information processing apparatus 200 and the server 800 are not necessarily limited to the above-described example as long as the configurations of the information processing apparatus 200 and the server 800 are realized.

Another example of the configuration of the information processing system according to the present embodiment has been described above as the third modification with reference to FIGS. 11 and 12.

Fourth Modification

Next, as a fourth modification, an example of the system configuration of the information processing system according to the present embodiment will be described.

Figure 13:
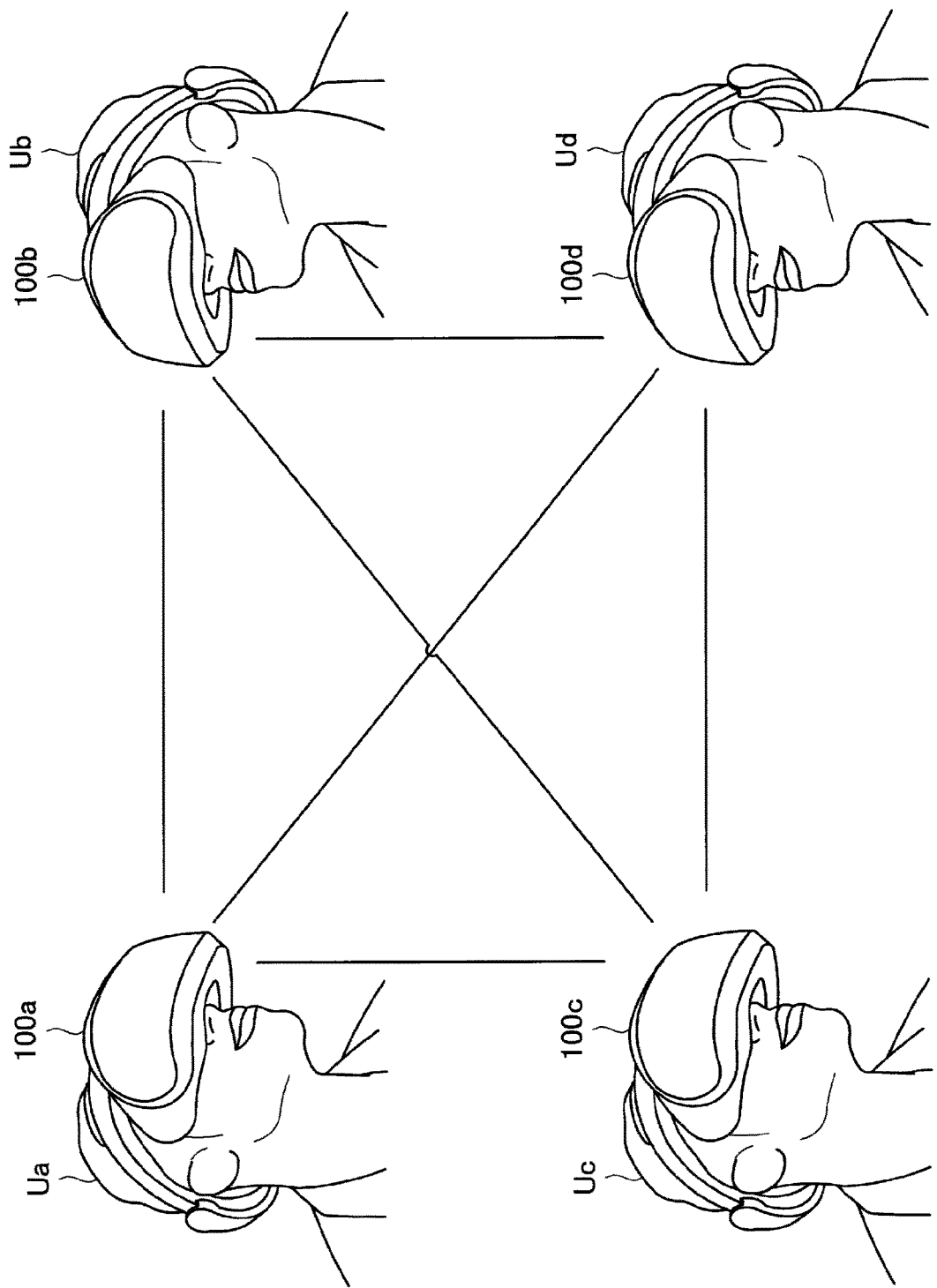
FIG. 13 is a diagram illustrating an example of a configuration of an information processing system according to a fourth modification.

The system configuration of the information processing system according to the present embodiment is not especially limited as long as a plurality of the information processing apparatuses 100 can mutually transmit and receive information (for example, images of users) via a predetermined network. For example, FIG. 13 is a diagram illustrating an example of the configuration of the information processing system according to the fourth modification. In the example illustrated in FIG. 13, each of the plurality of information processing apparatuses 100 (for example, the information processing apparatuses 100a to 100d) constructs a network with each of the other information processing apparatuses 100 without having another apparatus such as the server 800 therebetween. A more specific example includes a case where the plurality of information processing apparatuses 100 constructs a so-called ad hoc network.

In this case, each information processing apparatus 100 may individually perform estimation of the facial expression of the owner user and adjustment of the facial expression of the owner user, and estimation of the facial expression of the another user and adjustment of the facial expression of the another user, similarly to the example described with reference to FIG. 3.

Furthermore, as another example, each information processing apparatus 100 may transmit the estimation result of the facial expression of the owner user in addition to the image of the owner user (in other words, the owner's image) to the other information processing apparatuses 100. In this case, each information processing apparatus 100 may use the estimation result of the facial expression of the user (in other words, the another user) of the another information processing apparatus 100 transmitted from the another information processing apparatus 100, for the adjustment of the image of the another user (in other words, the another's image), similarly to the example described with reference to FIG. 9. Furthermore, the adjustment of the facial expression of the user of the information processing apparatus 100 as a transmission source may be collectively executed on the other information processing apparatuses 100 side as transmission destinations. In this case, for example, the image associated with the user (in other words, the image before the image processing is applied) of the information processing apparatus 100 may be transmitted together with the estimation result of the facial expression of the user and the information indicating the gain $Gm_n$ corresponding to the user from the information processing apparatus 100 as the transmission source to the other information processing apparatuses 100 as the transmission destination.

Furthermore, as another example, at least one or more information processing apparatuses 100, of the plurality of information processing apparatuses 100, may play a role of the server 800 in the example described with reference to FIG. 9. Furthermore, the function of the server 800 in the example described with reference to FIG. 9 may be realized by distributed processing by the plurality of information processing apparatuses 100.

Of course, the above-described example is merely an example, and the configuration is not particularly limited as long as each function of the information processing system according to the embodiment and the various modifications described above is realized.

Another example of the system configuration of the information processing system according to the present embodiment has been described as the fourth modification with reference to FIG. 13.

4. Example of Hardware Configuration

Figure 14:
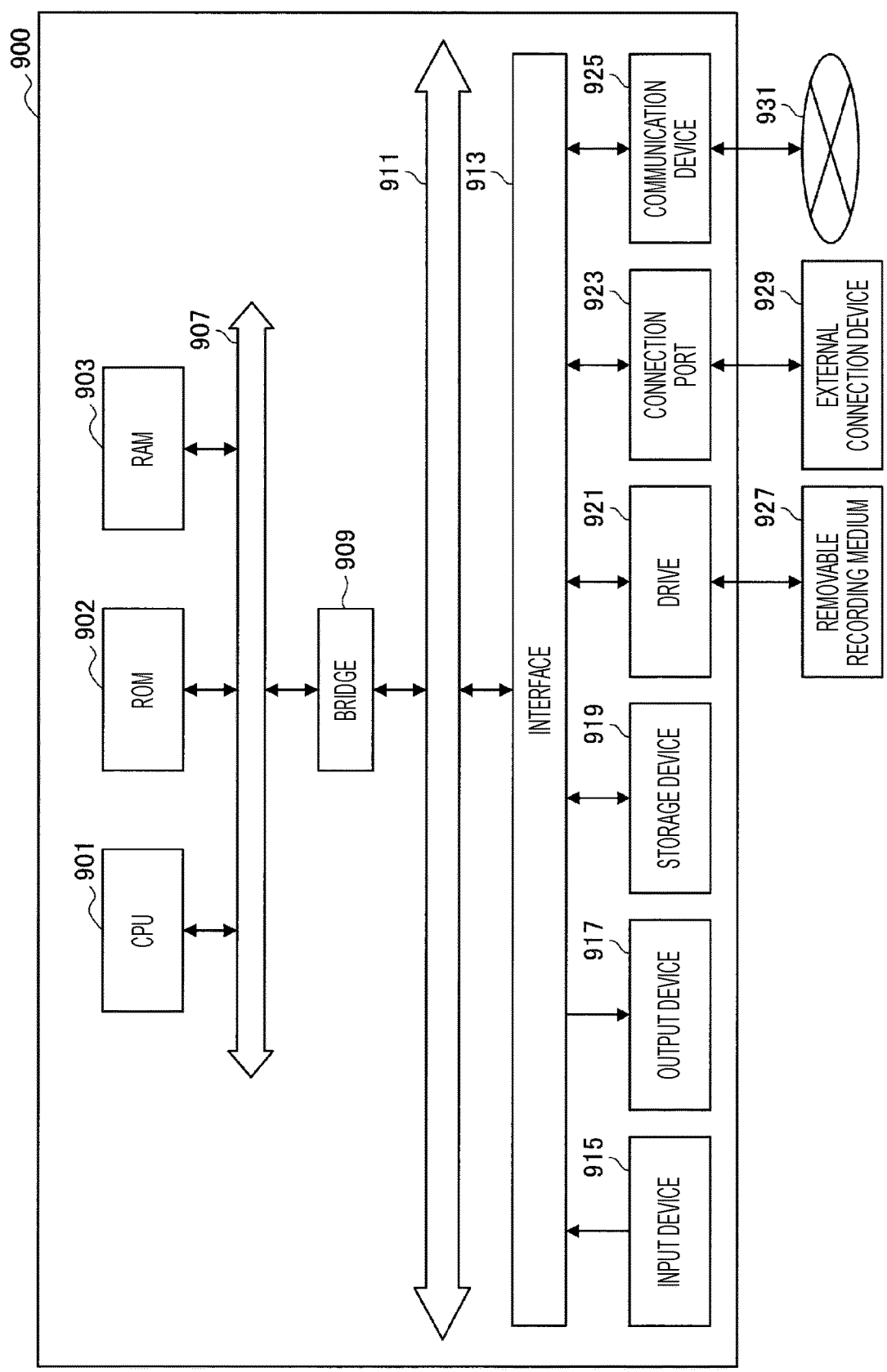
FIG. 14 is a functional block diagram illustrating a configuration example of a hardware configuration of an information processing apparatus according to an embodiment of the present disclosure.

Next, an example of a hardware configuration of an information processing apparatus configuring an information processing system according to an embodiment of the present disclosure, such as the above-described information processing apparatus 100 or server 800, will be described with reference to FIG. 14 in detail. FIG. 14 is a functional block diagram illustrating a configuration example of a hardware configuration of an information processing apparatus configuring a communication system according to an embodiment of the present disclosure.

An information processing apparatus 900 configuring the communication system according to the present embodiment mainly includes a CPU 901, a ROM 903, and a RAM 905. Furthermore, the information processing apparatus 900 includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit, and controls the entire operation or a part of the information processing apparatus 900 according to various programs recorded in the ROM 903, the RAM 905, the storage device 919, or a removable recording medium 927. The ROM 903 stores programs, operation parameters, and the like used by the CPU 901. The RAM 905 primarily stores the programs used by the CPU 901, parameters that appropriately change in execution of the programs, and the like. The CPU 901, the ROM 903, and the RAM 905 are mutually connected by the host bus 907 configured by an internal bus such as a CPU bus. For example, the owner's facial expression estimation unit 101, the owner's facial expression image control unit 103, the compression processing unit 105, the decompression processing unit 111, the another's facial expression estimation unit 113, the another's facial expression image control unit 115, and the gain calculation unit 117 can be configured by the CPU 901.

The host bus 907 is connected to the external bus 911 such as a peripheral component interconnect/interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation means operated by the user, such as a mouse, a keyboard, a touch panel, a button, a switch, a lever, and a pedal. Furthermore, the input device 915 may be, for example, a remote control means (so-called remote control) using infrared rays or other radio waves or an externally connected device 929 such as a mobile phone or a PDA corresponding to an operation of the information processing apparatus 900. Moreover, the input device 915 is configured by, for example, an input control circuit for generating an input signal on the basis of information input by the user using the above-described operation means and outputting the input signal to the CPU 901, or the like. The user of the information processing apparatus 900 can input various data and give an instruction on processing operations to the information processing apparatus 900 by operating the input device 915. For example, the input unit 197 illustrated in FIG. 3 may be configured by the input device 915.

The output device 917 is configured by a device that can visually or audibly notify the user of acquired information. Such devices include display devices such as a CRT display device, a liquid crystal display device, a plasma display device, an EL display device, a lamp, and the like, sound output devices such as a speaker and a headphone, and a printer device. The output device 917 outputs, for example, results obtained by various types of processing performed by the information processing apparatus 900. Specifically, the display device displays the results of the various types of processing performed by the information processing apparatus 900 as texts or images. Meanwhile, the sound output device converts an audio signal including reproduced sound data, voice data, or the like into an analog signal and outputs the analog signal. For example, the output unit 191 illustrated in FIG. 3 may be configured by the output device 917.

The storage device 919 is a device for data storage configured as an example of a storage unit of the information processing apparatus 900. The storage device 919 is configured by a magnetic storage device such as a hard disk drive (HDD), a semiconductor storage device, an optical storage device, a magneto-optical storage device, or the like. The storage device 919 stores programs executed by the CPU 901, various data, and the like. For example, the storage unit 107 illustrated in FIG. 3 may be configured by the storage device 919.

The drive 921 is a reader/writer for a recording medium, and is built in or is externally attached to the information processing apparatus 900. The drive 921 reads out information recorded on the removable recording medium 927 such as a mounted magnetic disk, optical disk, magneto-optical disk, or semiconductor memory, and outputs the information to the RAM 905. Furthermore, the drive 921 can also write a record on the removable recording medium 927 such as the mounted magnetic disk, optical disk, magneto-optical disk, or semiconductor memory. The removable recording medium 927 is, for example, a DVD medium, an HD-DVD medium, a Blu-ray (registered trademark) medium, or the like. Furthermore, the removable recording medium 927 may be a compact flash (CF (registered trademark)), a flash memory, a secure digital (SD) memory card, or the like. Furthermore, the removable recording medium 927 may be, for example, an integrated circuit (IC) card on which a non-contact IC chip is mounted, an electronic device, or the like.

The connection port 923 is a port for being directly connected to the information processing apparatus 900. Examples of the connection port 923 include a universal serial bus (USB) port, an IEEE 1394 port, and a small computer system interface (SCSI) port. Other examples of the connection port 923 include an RS-232C port, an optical audio terminal, and a high-definition multimedia interface (HDMI) (registered trademark) port. By connecting the externally connected device 929 to the connection port 923, the information processing apparatus 900 directly acquires various data from the externally connected device 929 and provides various data to the externally connected device 929.

The communication device 925 is, for example, a communication interface configured by a communication device for being connected to a communication network (network) 931, and the like The communication device 925 is, for example, a communication card for a wired or wireless local area network (LAN), Bluetooth (registered trademark), a wireless USB (WUSB), or the like. Furthermore, the communication device 925 may be a router for optical communication, a router for an asymmetric digital subscriber line (ADSL), a modem for various communications, or the like. The communication device 925 can transmit and receive signals and the like to and from the Internet and other communication devices in accordance with a predetermined protocol such as TCP/IP, for example. Furthermore, the communication network 931 connected to the communication device 925 is configured by a network or the like connected by wire or wireless means, and may be, for example, the Internet, home LAN, infrared communication, radio wave communication, satellite communication, or the like. For example, the communication unit 199 illustrated in FIG. 3 may be configured by the communication device 925.

In the above, an example of the hardware configuration which can realize the functions of the information processing apparatus 900 configuring the communication system according to the embodiment of the present disclosure has been described. Each of the above-described constituent elements may be configured using general-purpose members or may be configured by hardware specialized for the function of each constituent element. Therefore, the hardware configuration to be used can be changed as appropriate according to the technical level of the time of carrying out the present embodiment. Note that, although not illustrated in FIG. 14, various configurations corresponding to the information processing apparatus 900 configuring the information processing system are naturally provided.

Note that a computer program for realizing the functions of the information processing apparatus 900 configuring the information processing system according to the above-described present embodiment can be prepared and implemented on a personal computer or the like. Furthermore, a computer-readable recording medium in which such a computer program is stored can also be provided. The recording medium is, for example, a magnetic disk, an optical disk, a magneto-optical disk, a flash memory, or the like. Furthermore, the above computer program may be delivered via, for example, a network without using a recording medium. Furthermore, the number of computers that execute the computer program is not particularly limited. For example, a plurality of computers (for example, a plurality of servers or the like) may execute the computer program in cooperation with one another.

5. Conclusion

As described above, in the information processing system according to the present embodiment, in a case where an image (for example, a face image) associated with the user Ua is presented to the user Ub, the image processing based on the first setting associated with the user Ua and the second setting associated with the user Ub is applied to the image associated with the user Ua. Here, an example of the first setting associated with the user Ua includes, for example, the setting related to the application amount of the image processing for the image associated with the user himself/herself (in other words, the user Ua) on the basis of an estimation result of the emotion of the user himself/herself, the setting having been set by the user Ua (the setting is, for example, the gain $Gm_n$ set by the user Ua, or the like). Furthermore, an example of the second setting associated with the user Ub includes, for example, the setting related to the application amount of the image processing for the image associated with another user (for example, the user Ua) on the basis of an estimation result of the emotion of the another user, the setting having been set by the user Ub (the setting is, for example, the gain $Go_n$ set by the user Ub, or the like).

With such a configuration, according to the information processing system of the present embodiment, an image reflecting the facial expression or emotion of the user can be presented to another user via the network by the user wearing the head-mounted device even in a situation where at least a part of the face of the user is blocked. Furthermore, as described above, the information processing apparatus 100 according to the present embodiment controls the application amount of the image processing for the image associated with the user according to the predetermined setting. By such control, for example, an image simulating the facial expression or emotion intended by the user can be presented to another user by increasing the application amount of the image processing even in a situation where the user is uncomfortable actually taking an overreaction.

Furthermore, for example, when presenting the image reflecting the facial expression or emotion of the user Ua to the user Ub, the information processing apparatus 100b may adjust the facial expression of the user Ua in the image according to the setting associated with the user Ub (for example, setting specified by the user Ub). With such a configuration, for example, the facial expression of the user Ua in the image to be presented to the user Ub can be adjusted on the information processing apparatus 100b side according to the state of the user Ub even in a situation where the user Ua has a difficulty in spontaneously adjusting the facial expression (for example, adjusting the magnitude of the reaction) in view of the state on the user Ub side.

As described above, according to the information processing system of the present embodiment, the non-verbal communication using the user's facial expression can be realized in a more favorable manner between the users via the network.

Although the favorable embodiments of the present disclosure have been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)
An information processing apparatus including:
a communication unit configured to perform communication with an external device via a predetermined network; and
a control unit configured to perform control regarding presentation of a second image to a second user, the second image being generated by applying image processing based on first setting associated with a first user and second setting associated with the second user to a first image associated with the first user.

(2)
The information processing apparatus according to (1), in which at least one of the first setting or the second setting is determined according to an estimation result of a facial expression or an emotion of the first user.

(3)
The information processing apparatus according to (1) or (2), in which the second setting is set for each of the first users.

(4)
The information processing apparatus according to any one of (1) to (3), in which each of the first setting and the second setting includes information regarding an application amount of the image processing.

(5)
The information processing apparatus according to (4), in which an application amount of the image processing for generating the second image on the basis of the first image is determined according to the application amount of the image processing based on the first setting and the application amount of the image processing based on the second setting.

(6)
The information processing apparatus according to (4) or (5), in which the application amount of the image processing based on the second setting is controlled according to a predetermined limit value.

(7)
The information processing apparatus according to any one of (4) to (6), in which the application amount of the image processing based on at least one of the first setting or the second setting is controlled according to a user input from a user corresponding to the setting.

(8)
The information processing apparatus according to any one of (4) to (7), in which the application amount of the image processing based on at least one of the first setting or the second setting is controlled according to a detection result of a predetermined state or situation.

(9)
The information processing apparatus according to any one of (4) to (8), in which the application amount of the image processing based on at least one of the first setting or the second setting is controlled according to diversity information regarding at least one of a culture, a race, a nationality, a gender, and an age.

(10)
The information processing apparatus according to any one of (1) to (9), in which the control unit performs, as the control, control to present the second image to the second user via a predetermined output unit.

(11)
The information processing apparatus according to (10), further including:
an image processing unit configured to generate the second image by applying image processing based on the second setting to a third image generated by applying the image processing based on the first setting to the first image, the third image being transmitted from an external device via the network.

(12)

The information processing apparatus according to (11), further including:

an estimation unit configured to estimate a facial expression or an emotion of the first user on the basis of a result of analysis processing by applying the analysis processing to the third image, in which the image processing unit generates the second image by applying the image processing to the third image on the basis of the second setting determined according to the estimation result of the facial expression or the emotion of the first user.

(13)

The information processing apparatus according to (11), in which the image processing unit acquires information indicating the estimation result of the facial expression or the emotion of the first user from the external device via the network, and generates the second image by applying the image processing to the third image on the basis of the second setting determined according to the estimation result.

(14)

The information processing apparatus according to (10), further including:

an image processing unit configured to generate the second image by applying the image processing based on the first setting and the second setting based on information given in notification from an external device to the first image transmitted from the external device via the network.

(15)

The information processing apparatus according to any one of (1) to (9), in which the control unit performs, as the control, control to transmit the second image to an external device associated with the second user via the network.

(16)

The information processing apparatus according to (15), further including:

an image processing unit configured to generate the second image by applying the image processing on the basis of the first setting and the second setting to the first image, in which the control unit transmits the generated second image to the external device associated with the second user.

(17)

The information processing apparatus according to (16), in which the first setting and the second setting are determined according to information indicating an estimation result of a facial expression or an emotion of the first user given in notification via the network from an external device associated with the first user.

(18)

The information processing apparatus according to (16), further including:

an estimation unit configured to estimate a facial expression or an emotion of the first user on the basis of information indicating a detection result by a predetermined detection unit, the information being given in notification via the network from an external device associated with the first user, in which the first setting and the second setting are determined according to the estimation result.

(19)

The information processing apparatus according to (15), further including:

an image processing unit configured to generate the second image by applying the image processing based on the second setting to the third image generated by applying the image processing based on the first setting to the first image, in which the control unit transmits the generated second image to the external device associated with the second user.

(20)

The information processing apparatus according to any one of (1) to (9), further including:

an image processing unit configured to generate a third image by applying the image processing based on the first setting to the first image, in which the control unit performs, as the control, control to transmit the generated third image as data for generating the second image to an external device via the network.

(21)

The information processing apparatus according to any one of (1) to (9), in which the information processing apparatus is an apparatus associated with the first user, and the control unit performs, as the control, control to transmit at least one of the first image and information regarding the first setting as data for generating the second image to an external device via the network.

(22)

The information processing apparatus according to any one of (1) to (21), in which the first image is an image in which a face of the first user is presented.

(23)

An information processing method including:

by a computer, performing communication with an external device via a predetermined network; and performing control regarding presentation of a second image to a second user, the second image being generated by applying image processing based on first setting associated with a first user and second setting associated with the second user to a first image associated with the first user.

(24)

A program for causing a computer to perform communication with an external device via a predetermined network; and perform control regarding presentation of a second image to a second user, the second image being generated by applying image processing based on first setting associated with a first user and second setting associated with the second user to a first image associated with the first user.

REFERENCE SIGNS LIST

1 Information processing system
100, 200, 300 Information processing apparatus
101, 201, 301 Owner's facial expression estimation unit
103, 203, 303 Owner's facial expression image control unit
105, 205, 305 Compression processing unit
107, 207, 307 Storage unit
111, 211, 311 Decompression processing unit
113 Another's facial expression estimation unit
115, 215, 315 Another's facial expression image control unit
117, 217, 317 Gain calculation unit
191 Output unit
193 Imaging unit
195 Detection unit
197 Input unit
199 Communication unit
319 Image synthesis unit
800 Server

The invention claimed is:

1. An information processing apparatus comprising:
a communication unit configured to perform communication with an external device via a network to receive, from the external device, a first image including a facial expression of a first user and an image of an appearance of the first user reflecting the first image, the first image being generated by applying image processing based on first setting associated with the first user; and
a control unit configured to
analyze the image of the appearance of the first user to estimate second setting associated with a second user,
adjust, based on the second setting associated with the second user, the facial expression of the first user included in the first image to an adjusted facial expression of the first user included a second image different than the first image, and
control presentation of the second image to the second user,
wherein the communication unit and the control unit are each implemented via at least one processor.

2. The information processing apparatus according to claim 1, wherein at least one of the first setting or the second setting is determined according to an estimation result of a facial expression or an emotion of the first user.

3. The information processing apparatus according to claim 1, wherein the communication unit is further configured to perform communication with external devices via the network to receive first images associated with first users, and
the second setting is set for each of the first users.

4. The information processing apparatus according to claim 1, wherein each of the first setting and the second setting includes information regarding an application amount of the image processing.

5. The information processing apparatus according to claim 4, wherein an application amount of the image processing for generating the second image on a basis of the first image is determined according to the application amount of the image processing based on the first setting and the application amount of the image processing based on the second setting.

6. The information processing apparatus according to claim 4, wherein the application amount of the image processing based on the second setting is controlled according to a predetermined limit value.

7. The information processing apparatus according to claim 4, wherein the application amount of the image processing based on at least one of the first setting or the second setting is controlled according to a user input from a user corresponding to the first setting or the second setting.

8. The information processing apparatus according to claim 4, wherein the application amount of the image processing based on at least one of the first setting or the second setting is controlled according to a detection result of a predetermined state or situation.

9. The information processing apparatus according to claim 4, wherein the application amount of the image processing based on at least one of the first setting or the second setting is controlled according to diversity information regarding at least one of a culture, a race, a nationality, a gender, or an age.

10. The information processing apparatus according to claim 1, wherein the control unit is further configured to perform, as the control, control to present the second image to the second user via a predetermined output unit.

11. The information processing apparatus according to claim 10, further comprising:
an image processing unit configured to generate the second image by applying image processing based on the second setting to a third image generated by applying the image processing based on the first setting to the first image, the third image being transmitted from an external device via the network,
wherein the image processing unit is implemented via at least one processor.

12. The information processing apparatus according to claim 11, further comprising:
an estimation unit configured to estimate a facial expression or an emotion of the first user on a basis of a result of analysis processing by applying the analysis processing to the third image, wherein
the image processing unit is further configured to generate the second image by applying the image processing to the third image on a basis of the second setting determined according to a result of the estimation of the facial expression or the emotion of the first user, and
the estimation unit is implemented via at least one processor.

13. The information processing apparatus according to claim 12, wherein the image processing unit is further configured to
acquire information indicating the estimation result of the facial expression or the emotion of the first user from the external device via the network, and
generate the second image by applying the image processing to the third image on a basis of the second setting determined according to the estimation result.

14. The information processing apparatus according to claim 10, further comprising:
an image processing unit configured to generate the second image by applying the image processing based on the first setting and the second setting based on information given notification from an external device to the first image transmitted from the external device via the network,
wherein the image processing unit is implemented via at least one processor.

15. The information processing apparatus according to claim 1, wherein the control unit is further configured to perform, as the control, control to transmit the second image to an external device associated with the second user via the network.

16. The information processing apparatus according to claim 15, further comprising:
an image processing unit configured to generate the second image by applying the image processing on a basis of the first setting and the second setting to the first image, wherein
the control unit is further configured to transmit the generated second image to the external device associated with the second user, and
the image processing unit is implemented via at least one processor.

17. The information processing apparatus according to claim 16, wherein the first setting and the second setting are determined according to information indicating an estimation result of a facial expression or an emotion of the first user given in notification via the network from an external device associated with the first user.

18. The information processing apparatus according to claim 16, further comprising:
an estimation unit configured to estimate a facial expression or an emotion of the first user on a basis of information indicating a detection result by a predetermined detection unit, the information being given in notification via the network from an external device associated with the first user, wherein
the first setting and the second setting are determined according to the estimation result, and
the estimation unit is implemented via at least one processor.

19. The information processing apparatus according to claim 15, further comprising:
an image processing unit configured to generate the second image by applying the image processing based on the second setting to a third image generated by applying the image processing based on the first setting to the first image, wherein
the control unit is further configured to transmit the generated second image to the external device associated with the second user, and
the image processing unit is implemented via at least one processor.

20. The information processing apparatus according to claim 1, further comprising:
an image processing unit configured to generate a third image by applying the image processing based on the first setting to the first image, wherein
the control unit is further configured to perform, as the control, control to transmit the generated third image as data for generating the second image to an external device via the network, and
the image processing unit is implemented via at least one processor.

21. The information processing apparatus according to claim 1, wherein
the information processing apparatus is an apparatus associated with the first user, and
the control unit is further configured to perform, as the control, control to transmit at least one of the first image or information regarding the first setting as data for generating the second image to an external device via the network.

22. The information processing apparatus according to claim 1, wherein the first image is an image in which a face of the first user is presented.

23. An information processing method comprising:
performing, by an information processing device, communication with an external device via a network to receive, from the external device, a first image including a facial expression of a first user and an image of an appearance of the first user reflecting the first image, the first image being generated by applying image processing based on first setting associated with the first user;
analyzing the image of the appearance of the first user to estimate second setting associated with a second user;
adjusting, based on the second setting associated with the second user, the facial expression of the first user included in the first image to an adjusted facial expression of the first user included a second image different than the first image; and
controlling, by the information processing device, presentation of the second image to the second user.

24. A non-transitory computer-readable storage medium having embodied thereon a program, which when executed by a computer causes the computer to execute a method, the method comprising:
perform communication with an external device via a network to receive, from the external device, a first image including a facial expression of a first user and an image of an appearance of the first user reflecting the first image, the first image being generated by applying image processing based on first setting associated with the first user;
analyzing the image of the appearance of the first user to estimate second setting associated with a second user;
adjusting, based on the second setting associated with the second user, the facial expression of the first user included in the first image to an adjusted facial expression of the first user included a second image different than the first image; and
controlling presentation of the second image to the second user.

* * * * *